W. & W. A. CHURCH-SMITH.
VARIABLE SPEED GEAR.
APPLICATION FILED OCT. 20, 1910.
1,069,227.
Patented Aug. 5, 1913.
5 SHEETS—SHEET 1.
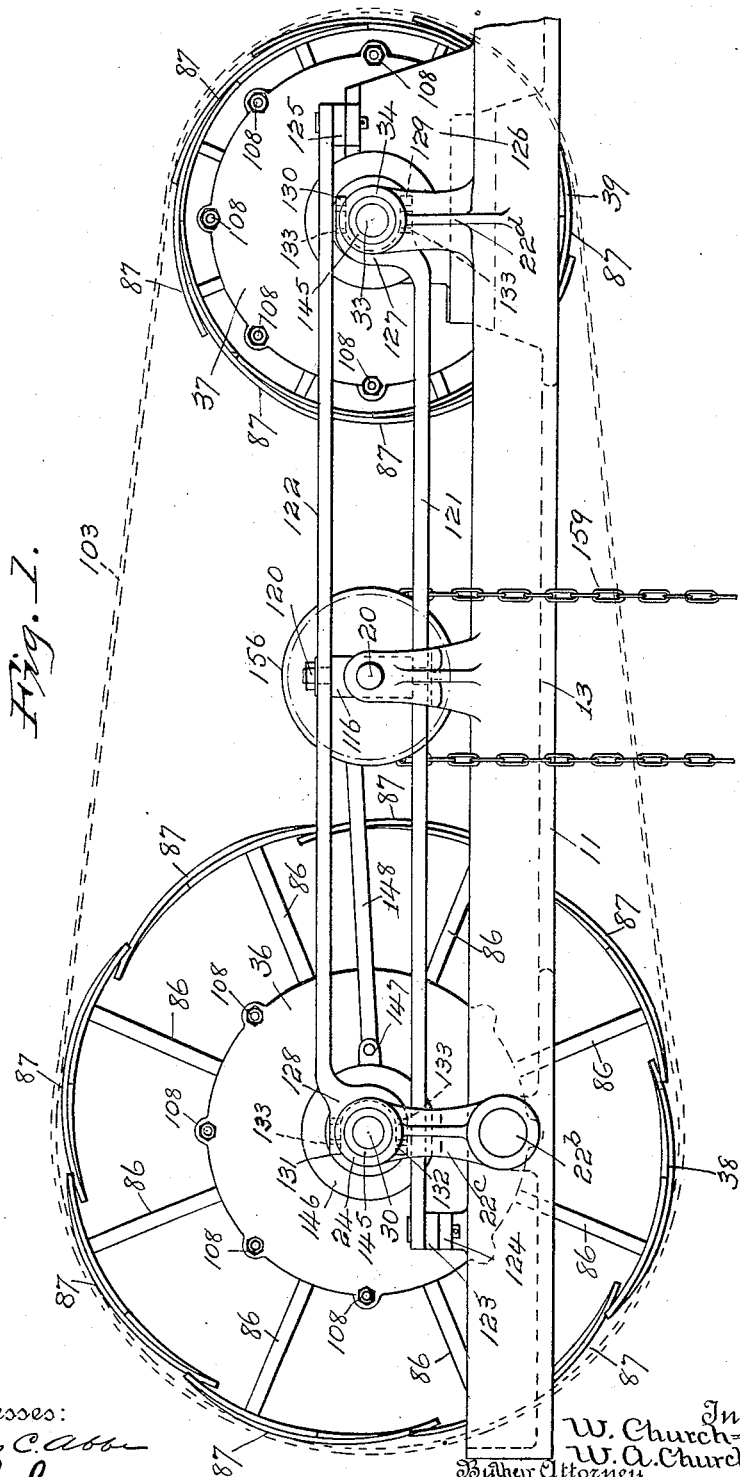

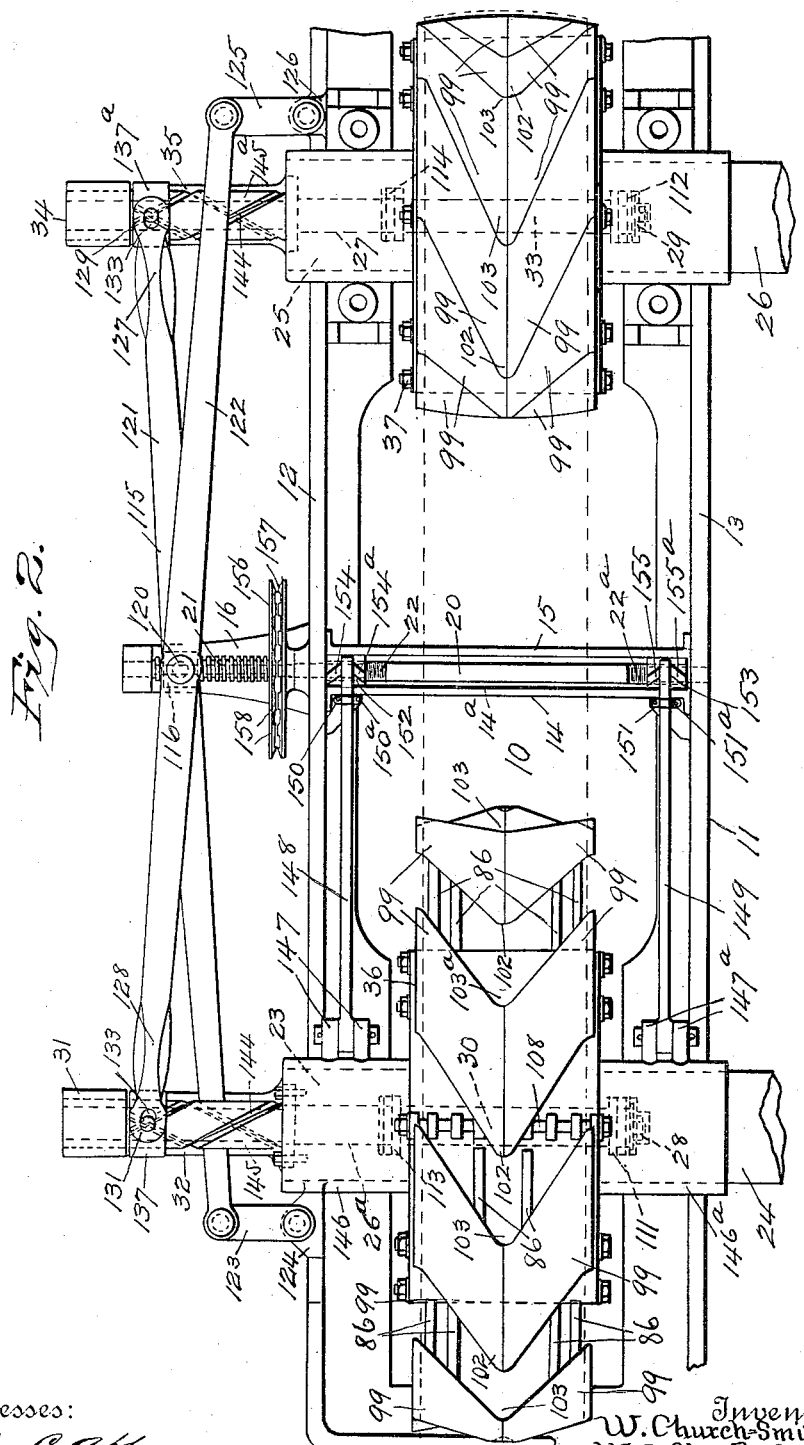

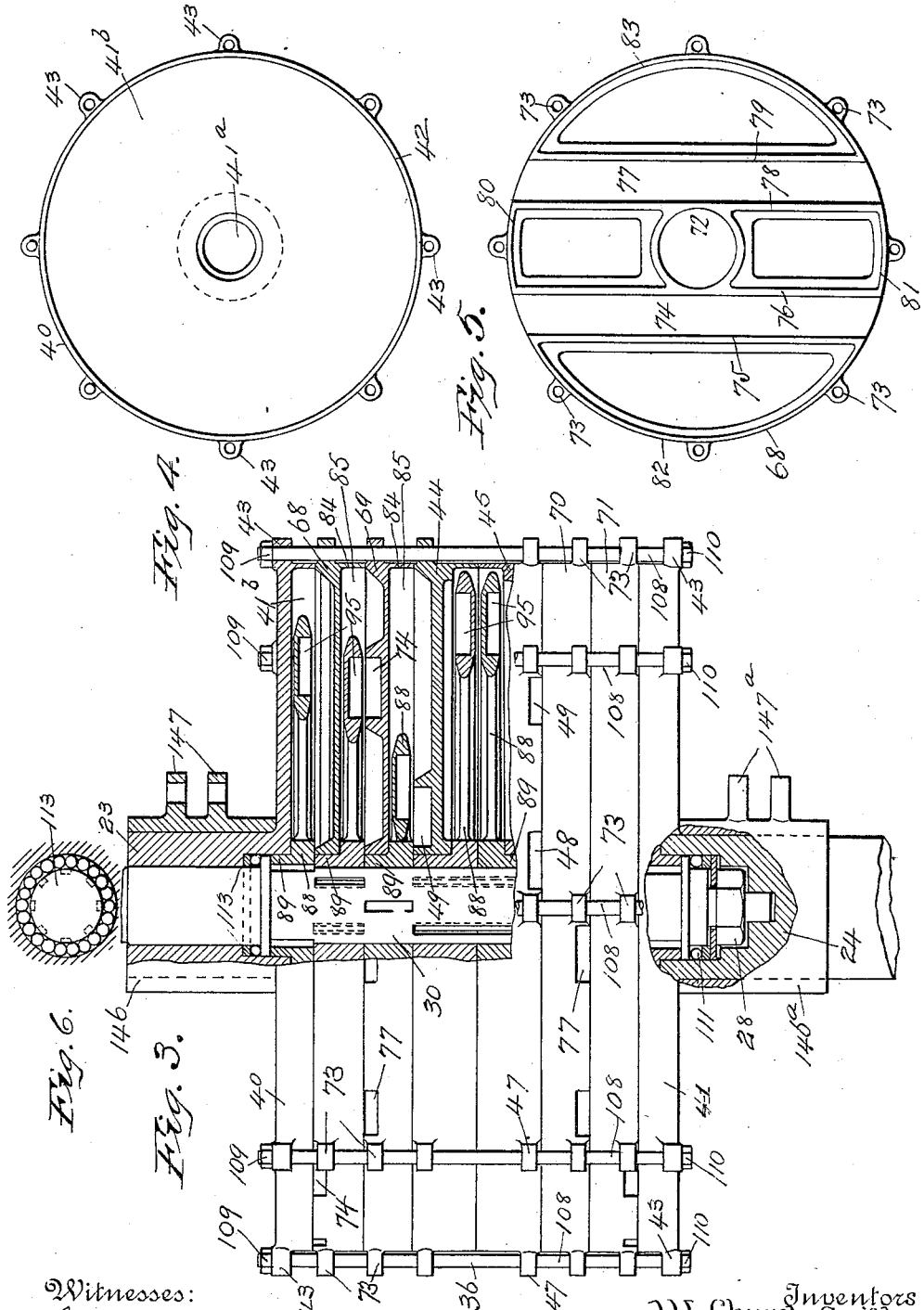

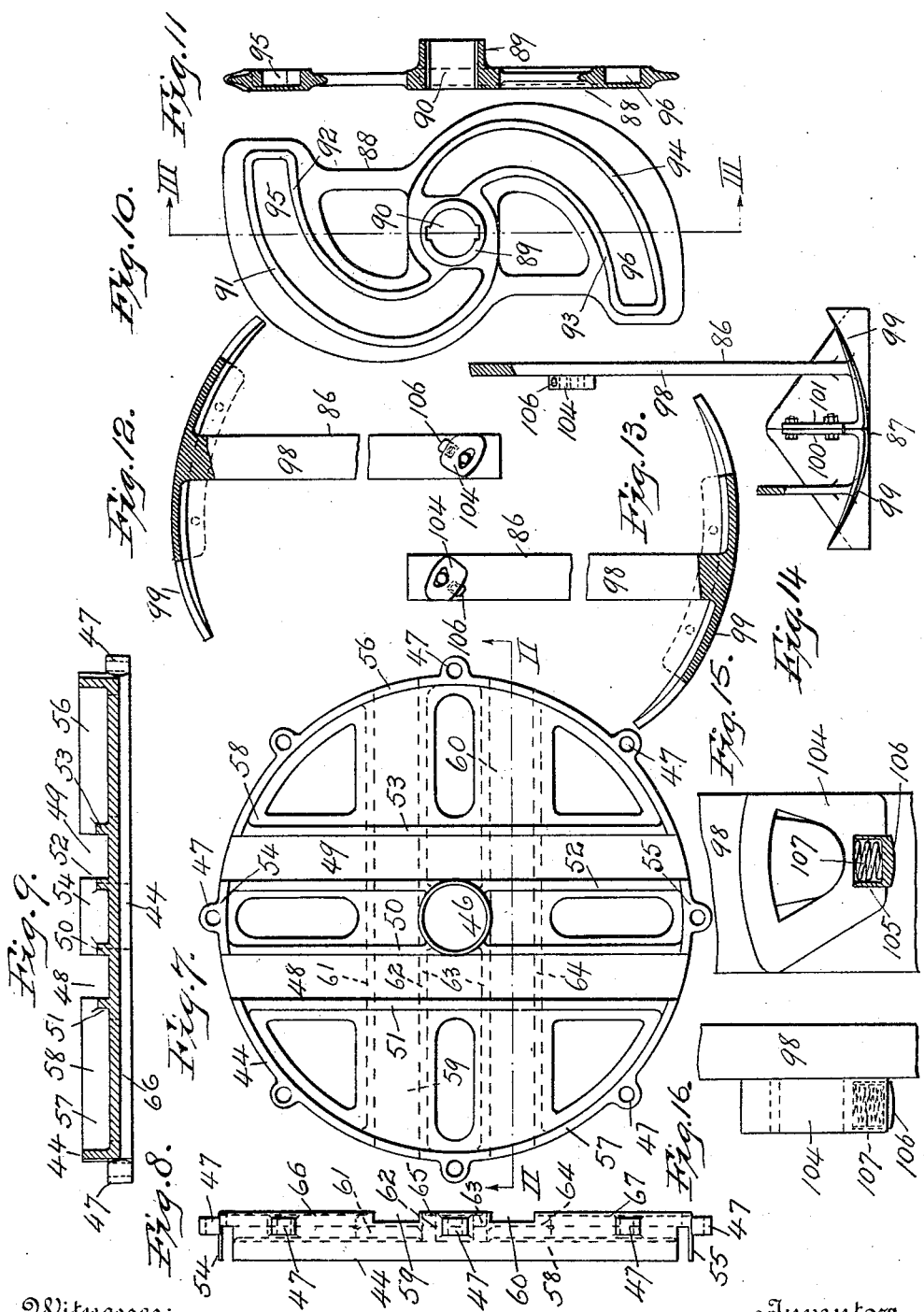

W. & W. A. CHURCH-SMITH.
VARIABLE SPEED GEAR.
APPLICATION FILED OCT. 20, 1910.
1,069,227.
Patented Aug. 5, 1913.
5 SHEETS—SHEET 5.
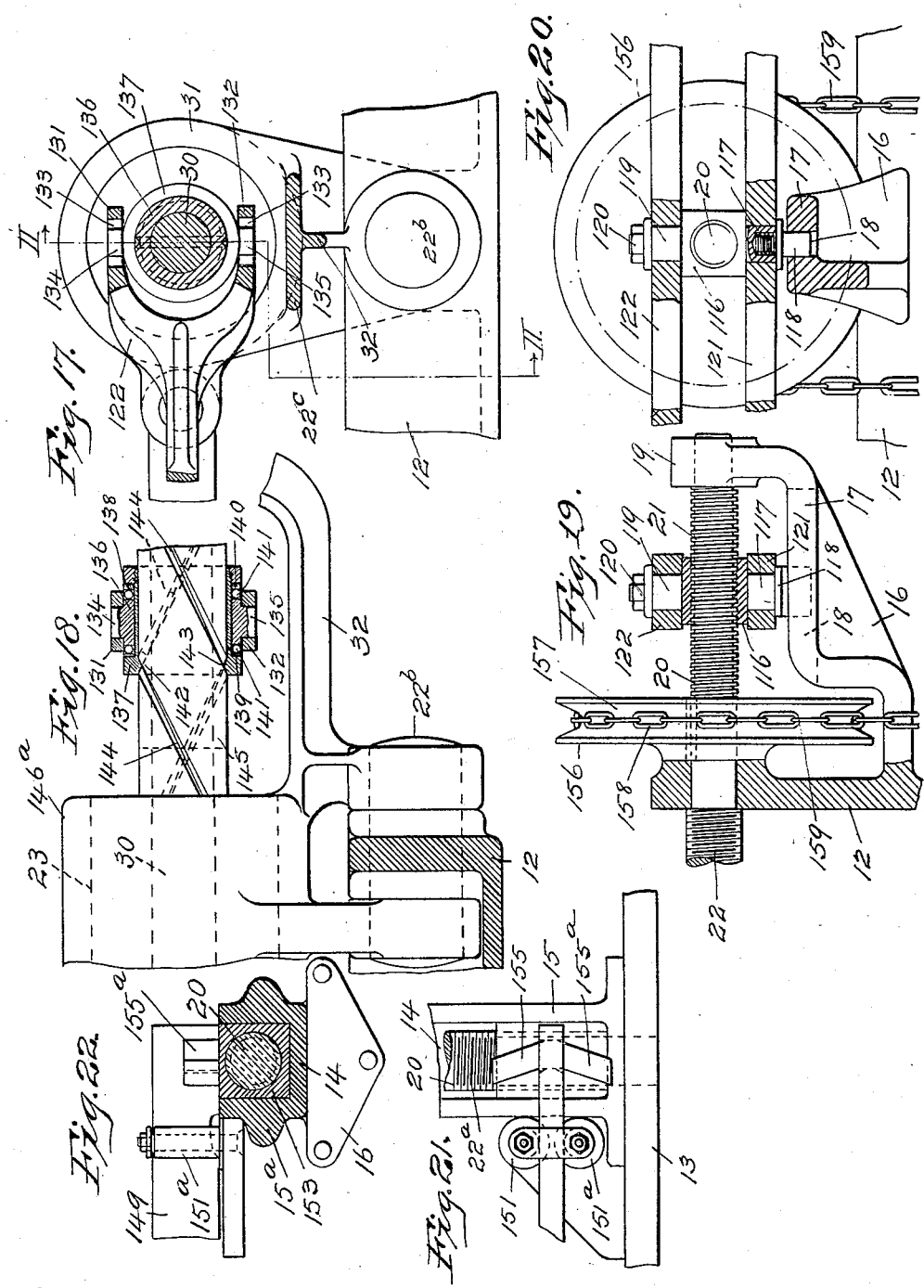
Witnesses:
Charles C. Abbe
S. Sahner
Inventors
W. Church-Smith
W. A. Church-Smith
By their Attorney
N. T. Criswell

UNITED STATES PATENT OFFICE.

WILLIAM CHURCH-SMITH AND WILLIAM A. CHURCH-SMITH, OF WHITESTONE, NEW YORK.

VARIABLE-SPEED GEAR.

1,069,227. Specification of Letters Patent. Patented Aug. 5, 1913.

Application filed October 20, 1910. Serial No. 588,229.

*To all whom it may concern:*

Be it known that we, WILLIAM CHURCH-SMITH and WILLIAM A. CHURCH-SMITH, both citizens of the United States, and residents of Whitestone, county of Queens, and State of New York, have invented certain new and novel Improvements in Variable-Speed Gears, of which the following is a full, clear, and exact specification.

This invention relates to a class of devices or form of mechanism adapted for use in conjunction with the operation of machinery whereby the highest efficiency may be obtained therefrom.

Our invention has for its primary object to provide a variable speed gear of durable and effective construction by which the power from the main source of motive supply may be transmitted at any desired ratio of speed to the operating shaft from which may be driven a plurality of machines; to provide a variable speed gear requiring a minimum amount of power for its operation and with little or no waste thereof; to provide a form of the gear adapted to transmit any amount of power; and to provide a gear which may be conveniently mounted on girders, ceilings, walls or floors of buildings as occasion may require. We attain these objects by providing two expansion pulleys which are carried by the same frame and are rotated at the same time by one belt. Each of the pulleys may be expanded to twice its diameter, and are altered in expansion and contraction simultaneously thereby producing the required variation of speed.

Further objects of our invention are to provide forms of expansion pulleys each having a rim consisting of a plurality of intersecting segments which are formed by two connected corresponding spokes each provided with a head-plate or a rim member; to provide a plurality of retaining plates as a means to guide the expansion and contraction of the spokes; to provide a plurality of adjusting devices or means adapted to move the spokes simultaneously to expanded or contracted positions; to provide means for operating the adjusting devices whereby the diameter of one of the pulleys will be increased and the diameter of the other pulley decreased simultaneously therewith; and to provide means adapted to take up any slack or sag of the belt trained over the pulleys.

With these and other objects in view, the invention will be hereinafter more particularly described with reference to the accompanying drawings which form a part of this specification and will then be pointed out in the appended claims.

In the drawing, Figure 1 is a side elevation of one form of a variable speed gear according to the present invention, mounted upon a suitable frame. Fig. 2 is a top plan view thereof. Fig. 3 is an enlarged top plan view, partly in section, of the drum of the expansion pulleys. Fig. 4 shows one of the end plates used in connection with my improved variable speed gear. Fig. 5 shows an intermediate spoke retaining plate. Fig. 6 is a view of one of the ball bearings used in connection with my improved variable speed gear. Fig. 7 is a plan view of one of the middle plates. Fig. 8 is a side view of the same. Fig. 9 is a section along line II—II of Fig. 7. Fig. 10 is a side elevation of one of the cam disks for operating the spokes. Fig. 11 is a section along line III—III of Fig. 10. Fig. 12 is a side view, partly in section, of one of the spokes centrally broken away, showing part of the rim member of one of said spokes. Fig. 13 is a similar view of another spoke. Fig. 14 is a side view of two of the spokes when connected, one of which being broken away. Fig. 15 is an enlarged front view of a cam-plate or guide-element used in conjunction with each of the spokes whereby the same may radially move by the cam disks. Fig. 16 is a side view thereof. Fig. 17 is an enlarged fragmentary end view, partly in section, of the means adapted to vary the diameters of the pulleys. Fig. 18 is a view, partly in section, taken on the line II—II of Fig. 17. Fig. 19 is a side elevation, partly in section, of the manually operative wheel for adjusting the various parts of our variable speed gear. Fig. 20 is an end view of the operating wheel, partly in section and partly broken away. Fig. 21 is a fragmentary top plan view of the means for taking up the slack of the belt, and Fig. 22 is an end view thereof, partly in section.

The variable speed gear 10 may be mounted upon a frame, as 11, of any preferred form and which is provided with side bars 12 and 13. Approximately centrally of the side bars 12 and 13 is provided a cross guide 14 formed of two parallel arranged L-shaped bars 14ª and 15, or by lengthwise slotting a single bar, as 15ª, Fig. 22, the opposite ends of each of which are connected to said side bars, and in alinement with the cross-bars 14ª and 15 is provided upon the side-bar 12 a projecting bracket 16. The bracket 16 has an arm 17 in the top face of which is formed a slot or groove 18, Figs. 19 and 20, and upon the end of said arm is provided a head 19 having a bearing therein. Journaled in the bearing of the head 19 is one end of an operating shaft 20 which is also journaled in the side-bar 12, from which said shaft is disposed transversely of the frame 11 between the L-shaped bars 14ª and 15 of the guide 14 and has the end thereof journaled in the side-bar 13. A portion of the shaft 20 between the side-bar 12 and head 19 of the bracket 16 is preferably channel-threaded, as 21, and the opposed parts thereof between and adjacent to the side-bars 12 and 13 is provided peripherally with V-shaped threads, as 22 and 22ª.

In one part of the side-bar 13 of the frame 11 is a short stud 22ᵇ upon which is rotatably held one end of a vertically-disposed link or movable bracket, as 22ᶜ, and in the side-bar 12 of the frame 11 is another short stud and a similar movable bracket. Upon the opposite part of the side-bar 13 is arranged a vertically disposed stationary bracket 22ᵈ and a similar stationary bracket, not shown, is provided upon the side-bar 12 of the frame 11. In the opposite end of each of the movable vertical links 22ᶜ is journaled a short shaft 23 and 24 adapted to be driven by the power from the main source of motive supply, and in the free end of each of the stationary vertical brackets 22ᵈ is journaled short shafts 25 and 26 from which the desired ratio of speed from the gear is transmitted to the main driving shaft of the machinery to be operated. Through each of the shafts 23 and 25 is a passage, as 26ª and 27, respectively, and one end of each of the shafts 24 and 26 is recessed, as at 28 and 29. In the recess 28 of the shaft 24 is rotatably held one end of an inner shaft 30 which is also directed through the passage 26ª of the shaft 23 and the opposite end of said inner shaft is journaled in the head 31 of a bracket 32 projecting laterally upon the movable bracket 22ᶜ. Likewise in the recess 29 of the shaft 26 is rotatably held one end of an inner shaft 33 which is directed through the passage 27 of the shaft 25 and the opposite end of said inner shaft is journaled in the head 34 of bracket 22ᵈ projecting laterally from the side-bar 12 of the frame 11.

Each of the drums 36 and 37 of the expansion pulleys 38 and 39 of our variable speed gear is disposed between and revolubly operated by the shafts 23, 24 and 25, 26 respectively. To one end of each of the shafts 23 and 25 is held a circular end plate 40 and to the opposed end of each of the shafts 24 and 26 is held a circular end-plate 41. The end-plates 40 and 41 are alike in form, each having a central opening 41ª. One face of each of said end-plates is recessed, as at 41ᵇ by providing a concentric flange 42 at the peripheral edge thereof, and projecting from the edge of each plate are a number of apertured lugs, as 43, which are spaced apart at intervals. Midway between the end-plates 40 and 41 are abutting middle plates 44 and 45.

The middle plates 44 and 45 are circular in form and of a similar size to the end-plates 40 and 41, each having a central opening 46 and provided with a like number of apertured lugs, as 47, projecting at spaced intervals upon its peripheral edge. As illustrated in Figs. 7, 8, 9, one face of each of the middle plates 44 and 45 has two spaced apart parallel arranged guides or grooves 48 and 49 directed across each of said plates from one peripheral edge to the opposite peripheral edge thereof. The guides or grooves 48 and 49 are formed between two parallel arranged flanges 50 and 51 disposed across the face at the central opening 46 of the plate and two similar flanges 52 and 53 disposed across said face at the opposite diameter of the opening 46. The opposed ends of each of the flanges 50 and 52 terminate with a short curved wall, as 54 and 55, formed integral therewith. At one peripheral edge of the same face of said plate is provided a semi-circular wall 56 having its ends forming a juncture with the ends of the flange 53 and diametrically opposite to the wall 56 is provided a similar semi-circular wall 57 which has its ends forming a juncture with the ends of the flange 51. The semi-circular walls 56 and 57 as well as the short curved walls 54 and 55 extend for a greater distance from the face of the plate than the flanges of the guides 48 and 49, thereby providing a recess 58 above said flanges which embraces the entire space between all of said walls. The opposite face of each of the middle plates 44 and 45 is provided with spaced apart parallel arranged guides or grooves 59 and 60 formed respectively between flanges 61, 62 and 63, 64, which are disposed crosswise, as indicated, with respect to the parallel flanges on the opposed face of the plate and are directed across each of said plates from one peripheral edge to the opposite peripheral edge thereof. At one of the ends of the flanges 62 and 63 is a short curved wall, as 65, and at the opposed ends of said flanges is a similar short wall, not shown. Also at one peripheral edge of the same face of each of the middle plates is provided a semi-circular wall 66 having its ends forming a juncture with the ends of the flange 61 and diametrically opposite to the wall 66 is provided a second semi-circular wall 67 the ends of which form a juncture with the ends of the flange 64. Between the end plate 40 and the middle plate 44 are arranged two contacting intermediate plates 68 and 69, and between the end-plate 41 and the middle plate 45 are arranged two contacting intermediate plates 70 and 71.

The intermediate plates 68, 69, 70 and 71 are circular in form and similar in diameter to the end plates and middle plates as above described. Each of the intermediate plates 68, 69, 70 and 71 has a central opening 72, Fig. 5, and at regular intervals upon the peripheral edge of each of said plates are formed apertured projecting lugs 73. Adjacent to one edge of the central opening 72 is provided upon one face of each of the intermediate plates a guide or groove 74 formed between two spaced apart parallel arranged flanges 75 and 76 which extend entirely across the plate and adjacent to the opposite edge of the central opening on the same face of the plate is a corresponding guide or groove 77 formed between spaced apart parallel arranged flanges 78 and 79 also extending entirely across the plate. The ends of the flanges 76 and 78 are connected by curved walls 80 and 81, and at the peripheral edge of the plate is provided between the ends of the flange 75 a semi-circular wall 82, while a similar semi-circular wall 83 is formed at the opposite peripheral edge of said plate between the ends of the flange 79. Upon the opposite face of each of the intermediate plates 68, 69, 70 and 71 is an annular flange 84, Fig. 3, at the edge thereof, and by which a recess 85 is provided. The intermediate plates 68, 69, 70 and 71 in conjunction with the middle plates 44 and 45 serve as a means to movably retain and guide the movement of spokes 86 of the segmental rims 87 of the pulleys 38 and 39 of our variable speed gear as will be hereinafter more fully described.

As a means adapted to move the spokes 86 simultaneously for moving the segmental rims 87 to expanded or contracted positions we provide a plurality of adjusting devices or cam disks 88. Figs. 3, 10 and 11. As indicated in Fig. 10, each of the cam disks 88 are substantially S-shaped and there are preferably eight of said disks employed in each of the drums 36 and 37 of the pulleys 38 and 39. From one face of each of the adjusting devices or cam disks 88 is a projecting boss 89 having an opening 90 therethrough. Upon the same face of each of the S-shaped disks 88 are formed spaced-apart projecting flanges, as 91, 92 and 93, 94, between which are provided cam grooves 95 and 96 which extend substantially the entire length of each of the curved arms thereof. Each of the disks 88 are rigidly keyed upon the shafts 30 and 33 of the pulleys 38 and 39, and one of said disks is positioned to rotate with said shafts in the recessed faces of each of the end plates 40, 41, each of the middle plates 44, 45 and each of the intermediate plates 68, 69, 70, 71. The central openings of the end plates, middle plates and intermediate plates are of a diameter so as to be loosely held upon the boss 89 of its associate cam disk 88 and by this arrangement said plates, will remain stationary when the cam disks are rotated by the shafts 30 and 33.

In each of the expansion pulleys 38 and 39 there are eight of the segmental rims 87 each consisting of two of the spokes 86, and thus there are sixteen spokes in each pulley. Each of the spokes 86 has a substantially rectangular arm 98 adapted to be guided in the grooves 48, 49 and 59, 60 and 74, 77 of the middle-plates 44 and 45 and the intermediate plates 68, 69, 70, 71, respectively. Upon one end of each of the arms 98 is a head-plate or rim member 99 of substantially the form of a parallelogram, Fig. 2, which is curved in the shape of an arc, as shown longitudinally in side view Figs. 1, 12, 13, and is also curved transversely, as indicated in Fig. 14. The spokes 86 and likewise the head-plates 99 are adapted to be arranged in pairs and connected by bolts, or otherwise, passing through openings in projecting flanges 100, and 101, Fig. 14, provided upon the corresponding transverse side of the head-plate of each pair of said spokes. By this manner of arranging each pair of the head-plates 99 one end of each of the segmental rims 87 is V-shaped, as 102, and at the opposite end thereof is a V-shaped notch 103ª so that all of the segmental rims will interfit to provide a proper bearing surface for the belt 103 which is trained over the pulleys 38 and 39 whether said pulleys are expanded or contracted. The arms 98 of each pair of the spokes 86 are disposed in parallel relation. In the formation of the segmental rims 87 of each of the expansible pulleys, 38, 39, four pairs of the spokes 86 are spaced apart at varying distances and the other four pairs of the spokes thereof are correspondingly spaced apart. Adjacent to the free end of the arm 98 of each spoke 86 is provided a lug or guiding element 104 having cam-shaped edges and one of the cam edges is recessed as at 105 in which is seated a buffer or resilient pad 106. One end of the buffer 106 is recessed and in said recess is a coil spring, as 107, which tends normally to press the buffer 106 from its seat within the recess 105 of the guiding element 104. The cam-shaped element 104 is adapted to be guided in the cam grooves 95 and 96 of the S-shaped arms of the disks or adjusting devices 88.

In assembling the drum 36 or 37 a cam disk 88 is keyed upon the inner shaft 30 or 33 and is seated in the recessed face 41ᵇ of the end plates 40, 42 and in the cam grooves 95 and 96 of the said disk are seated the lugs or guiding elements 104 of two of the spokes 86. The intermediate plate 68 is passed over the inner shaft 30 or 33 and another of the cam disks 88 is keyed upon the inner shaft after the boss 89 of said cam disk is directed through the opening 72 of said intermediate plate. By this arrangement the second cam disk 88 is positioned in the recess 85 of the plate 68 and the arms 98 of the two spokes 86 will be held so as to be moved in opposite directions in the guiding grooves 74 and 77 of said intermediate plate. In each of the cam grooves 95 and 96 of the second cam disk 88 is fitted the lugs or guiding elements 104 of two other spokes 86. The intermediate plate 69 is then passed over the inner shaft 30 or 33 and a third cam disk 88 is keyed upon the inner shaft after the boss 89 of the disk is directed through the opening 72 of the plate 69. The third cam disk 88 will be seated in the recess 85 of the plate 69 and the arms 98 of the third pair of spokes 86 will be disposed in the guiding grooves 48 and 49 of the middle plate 44 and adapted also to be moved therein in opposite directions when said middle plate is passed over the inner shaft and is followed by the fourth cam disk 88 being keyed upon said inner shaft subsequent to passing the boss 89 thereof through the opening 46 of the middle plate. In each of the cam grooves 95 and 96 of the fourth cam disk 88 is positioned the lugs or guiding element 104 of two more of the spokes 86, the fourth cam disk being seated in the recessed face 66 of the middle plate 44. Thus, as described, one-half of each of the drums 36 and 37 are formed and the other half thereof is similarly arranged, but the order is reversed in the arrangement of the middle plate 45, the intermediate plates 70 and 71, the end plate 41 and the other four cam disks 88, as well as the eight other spokes 86. When the drums 36 and 37 are assembled a plurality of tie rods, as 108, which are directed through corresponding apertured lugs 43 of the end plates 40 and 41, the apertured lugs 73 of the intermediate plates 68, 69, 70, 71, and the apertured lugs 47 of the middle plates 44 and 45, and the parts are held firmly together by nuts 109 and 110 screwed upon the opposed threaded ends of each of said tie rods. The segmental rims 87 of each of the pulleys 38 and 39 are then formed by connecting the projecting flanges 100 and 101 of the head-plates 99 with bolts, as above described, and in this manner the spokes 86 of two of the segmental rims will be adjusted in opposite directions by the cam disks 88 seated in the end plates 40 and 41. The spokes 86 of two other segmental rims 87 will be adjusted in opposite directions by the cam disks seated in the intermediate plates 68 and 71, and the spokes 86 of two more of the segmental rims will be adjusted in opposite directions by the cam disks seated in the intermediate plates 69 and 70 while the spokes 86 of the last two segmental rims of each pulley will be adjusted by the cam disks seated in the middle-plates 44 and 45. The intermediate plates 68, 69, 70, 71 and the middle plates 44, 45 are loosely held upon the bosses 89 of the cam disks 88 and as the cam disks are rigidly held to the inner shafts 30 and 33 it is clear, that all the segmental spokes 86 will be simultaneously adjusted to expand or contract the segmental rims 87 of each pulley when the inner shafts are rotated. The inner shafts 30 and 33 therefore serve as operating means for the cam disks 88 and are adapted to rotate independently of the short shafts 23 and 24, 25 and 26, which rotate when the pulleys 38 and 39 are revolved. In order to allow for free rotation of the expansion pulleys 38 and 39 upon the inner shafts 30 and 33 and in the recesses 28 and 29 of the short shafts 24 and 26 is provided a ball bearing 111 and 112, and in the passages 26 and 27 of the short shafts 23 and 25 is arranged a ball bearing 113 and 114.

To rotate the inner shafts in opposite directions whereby the diameter of the rim of one of the pulleys in our variable speed gear will be increased and the diameter of the rim of the other pulley will be simultaneously decreased we provide a form of means or adjusting levers 115. Upon the channel threaded portion of the shaft 20 is a nut 116 which is provided interiorly thereof with channel-threads so as to be adjusted upon said shaft when rotated. The nut 116 may be square or rectangular in shape and upon one of its faces is a boss 117 having a threaded recess therein for reception of the thread end of a lug or pin 118 which is guided in the slot or groove 18 of the arm 17 of the bracket 16. Upon the opposite face of the nut 116 is a similar boss 119 in which is screwed a bolt 120. Upon the boss 117 between the head of the lug 118 and the nut 116 is pivotally held substantially the central part of an adjusting lever or rod 121, and on the boss 119 between the head of the bolt 120 and the nut 116 is pivoted likewise substantially the central part of a second adjusting lever or rod 122. One end of the lever 121 is pivotally connected to a link 123 which is pivoted to a bracket 124 provided upon the side-bar 12 of the frame 11 adjacent to the forward part of the shaft of the pulley 38, and one end of the lever 122 is pivotally connected to a link 125 which is pivoted to a bracket 126 also provided upon the side bar 12 of the frame 11 adjacent to the rear part of the shaft of the pulley 39. The opposite end of each of the levers 121 and 122 is bifurcated or has a yoke, as 127 and 128, which have curved arms 129, 130 and 131, 132, respectively, and through the ends of all of said arms is formed an opening 133, Figs. 2 and 17, for reception of threaded pins 134 and 135 which may be screwed into openings provided diametrically opposite to each other in the exterior surface of an inner collar 136 of guiding sleeves 137 and 137$^a$. The exterior surface of each of the sleeves 137 and 137$^a$ is peripherally grooved, as 138, and within said groove is arranged the inner collar 136. Between the opposed peripheral edges of the inner collar 136 and the walls of the groove 138 of each of the sleeves 137 and 137$^a$ is provided a raceway 139 and 140 in each of which are revolubly held a plurality of anti-friction balls 141. At one edge of the interior surface of each of the sleeves 137 and 137$^a$ is a tooth 142 and diametrically opposite thereto is a second tooth 143 also formed upon the interior surface of said sleeves. The teeth 142 and 143 are guided in the spiral grooves 144 provided in the exterior surface of jackets 145 and 145$^a$ one of which is rigidly held upon each of the inner shafts 30 and 33 and arranged between the side bar 12 and the head 31 of the bracket 32. Thus the inner shafts 30 and 33 will be simultaneously rotated in opposite directions when the jackets 145 and 145$^a$ are revolved by the movement of the teeth 142 and 143 of the sleeve 137 in the groove 144 of said jacket for the purpose which will hereinafter be more fully explained.

In order to take up any slack or sag of the belt 103 simultaneously with the adjustment of the diameters of the rims of the pulleys 38 and 39 upon the shafts 23 and 24 are loosely held sleeves 146 and 146$^a$ and exteriorly upon each of said sleeves are formed spaced apertured lugs 147 and 147$^a$. Between each of the lugs 147 and 147$^a$ is pivotally held one end of adjusting arms 148 and 149, each of said arms are guided between two pulleys 150, 150$^a$ and 151, 151$^a$ arranged adjacent to the guide 14. Upon the V-shaped threaded portions 22 and 22$^a$ of the operating shaft 20 is provided a nut 152 and 153 adapted to be guided in the guide 14 between the L-shaped bars 14$^a$ and 15. Projecting upwardly from the top surface of each of the nuts 152 and 153 are two obliquely disposed lugs 154, 154$^a$ and 155, 155$^a$. The opposed end of each of the lugs 154, 154$^a$ and 155, 155$^a$ are spaced apart and in said space is held the respective ends of the adjusting arms 148 and 149 so that when the operating shaft 20 is rotated the nuts 152 and 153 will move transversely upon said shaft and in turn the said adjusting arms will be gripped by the lugs 154, 154$^a$ and 155, 155$^a$ to move said arms longitudinally whereby the vertical links 22$^c$ will be shifted to throw the pulley 38 in an outwardly direction with respect to the pulley 39, thus taking up all slack or sag of the belt 103.

For the purpose of conveniently and readily operating the various parts of our variable speed gear to simultaneously expand or increase the diameters of the pulleys 38 and 39 we provide a manually operative controlling means or wheel 156 Figs. 1, 2, 19, 20. The wheel 156 is keyed upon the shaft 20 above the arm 17 of the bracket 16 and adjacent to the cross-bar 12. The peripheral edge of the wheel 156 is grooved, as 157, and in said groove is provided a plurality of teeth 158 adapted to grip a chain or cable 159 which is trained in the groove over said wheel. By manually pulling one end of the chain 159 the wheel 156 and shaft 20 will be rotated and the nut 116 will be directed laterally upon said shaft. The levers or rods 121 and 122 will thereby be shifted for moving at the same time the guiding sleeves 137 and 137$^a$, so that the teeth 142 and 143 thereof will be guided in the spiral grooves 144 for rotating the jackets 145 and 145$^a$. Simultaneously with the rotation of the jackets 145 and 145$^a$ the inner shafts 30 and 33 of the drums 36 and 37 will be revolved in the same directions and the cam disks 88 which are keyed thereupon will accordingly be rotated. By arranging the cam disks 88 so that the spokes 86 of one of the pulleys will be expanded and the spokes 86 in the other pulley contracted, as shown in Fig. 2, the rotation of the cam disks 88 will cause the cam-shaped lugs 104 of the spokes 86 to be so guided in the cam grooves 95 and 96 as to move radially all the arms 98 of said spokes in the grooves 74 and 77 of the intermediate plates 68, 69, 70, 71 and in the grooves 48, 49 and 59 60 of the middle plates 44 and 45. The diameter of one of the pulleys will thereby be expanded and simultaneously therewith the diameter of the other pulley will be decreased as the movement of the parts thereof are operated in a similar manner but reversely, and when the wheel 156 is revolved any sag of the belt 103 is taken up, as above described, by shifting the pulley 38 with adjustment of the arms 148 and 149 when the operating shaft 20 is rotated.

In the foregoing description we have embodied the preferred form of our invention, but we do not wish to be understood as limiting ourselves thereto, as we are aware that modifications may be made therein without departing from the principle or sacrificing any of the advantages of this invention, therefore we reserve to ourselves the right

Having thus described our invention, we claim as new and desire to secure by Letters Patent:—

1. In a variable speed gear; in combination; a frame having two side bars; two expansion pulleys each arranged between one of the ends of the side bars and each having a drum; two rims, each provided upon one of the pulleys, and each consisting of a plurality of intermitting segments, each of said segments being formed of two connected curved parallelogram plates provided upon one surface thereof with spaced part parallel arranged corresponding spokes having their inner ends movably held in the drums and adapted to be adjusted radially with respect to the circumference of the drums; two tubular shafts and two recessed shafts, one of the tubular shafts and one of the recessed shafts being journaled in alinement at the opposite ends of the side bars of said frame; two inner shafts, each having one end rotatably held in one of the recessed shafts and the other end rotatable in the corresponding alined tubular shaft; four end-plates, forming the opposite faces of the drums and rigidly held to the opposite ends of said alined tubular shafts and recessed shafts; a plurality of disks keyed at intervals upon each of the inner shafts between the end-plates of the drums and having oppositely disposed cam grooves therein; means provided upon the end of each of the spokes and adapted to be guided in the cam grooves of the disks whereby said spokes may be adjusted to alternately expand and contract the segments of the rims of the pulleys simultaneously; an operating shaft journaled midway of the side bars of the frame; means provided upon the operating shaft and adapted when operated to simultaneously rotate the inner shafts for moving the disks to guide the adjusting means of the spokes in the cam grooves thereof; and manually operative means provided upon the operating shaft and adapted to operate the means for rotating said inner shaft.

2. In a variable speed gear; in combination a frame having two side bars; two expansion pulleys each arranged between the ends of the side bars and each having a drum; two rims, each provided upon one of the pulleys, and each consisting of a plurality of interfitting segments and each segment being formed of two curved parallelogram plates; means adapted to connect said plates; a plurality of pairs of spokes, each spoke having one of the ends thereof formed upon one surface of one of the curved plates; a guiding element provided at the opposite end of each of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of said alined tubular shafts and recessed shafts; a plurality of adjusting devices keyed at intervals upon each of the inner shafts between the end-plates of the drums and having oppositely disposed cam grooves therein for reception of the guiding elements of the spokes whereby said spokes may be adjusted to alternately expand and contract the segments of the rims of the pulleys simultaneously; an operating shaft journaled midway of the side bars of the frame; means provided upon the operating shaft and adapted when operated to simultaneously rotate the inner shafts for moving the adjusting devices to guide the guiding elements of the spokes in the cam groove; and manually operative means provided upon the operating shaft and adapted to operate the means for rotating said inner shaft.

3. In a variable speed gear; in combination; a frame having two side bars; two expansion pulleys each arranged between the ends of the side bars and each having a drum; two interfitting segmental rims, each provided upon one of the pulleys; a plurality of pairs of spokes, each spoke having one of the ends thereof formed upon one surface of one of the segments of the rims; a plurality of guiding elements, each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of cam disks keyed at intervals upon each of the inner shafts between the end-plates of the drums and having oppositely-disposed curved cam grooves therein for reception of the guiding elements of the spokes whereby the spokes may be adjusted to alternately expand and contract the segments of the rims of the pulleys simultaneously; a plurality of intermediate plates movably held to the cam disks and adapted to guide the spokes during adjustment thereof by the cam grooves of said cam disks; an operating shaft journaled midway of the side bars of the frame; means provided upon the operating shaft and adapted when operated to simultaneously rotate the inner shafts for moving the cam disks to guide the guiding elements of the spokes in the curved cam grooves; and manually operative means provided upon the operating shaft and adapted to operate the means for rotating said inner shaft.

4. In a variable speed gear; in combination; a frame having two side bars; two expansion pulleys each arranged between the ends of the side bars and each having a drum; two interfitting segmental rims, each provided upon one of the pulleys; a plurality of pairs of spokes, each spoke having one end thereof formed upon one surface of one of the segments of the rims; a guiding element provided at the opposite end of each of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of cam disks, each having a boss projecting from one end face thereof said disk being keyed at intervals upon each of the inner shafts between the end-plates of the drums, each of said cam disks having two oppositely-disposed guides provided in one face thereof and adapted to adjust the guiding elements of the spokes to alternately expand and contract the segments of the rims of the pulleys simultaneously; a plurality of intermediate plates, each loosely held upon the projecting boss of one of the cam disks and adapted to guide the spokes during adjustment thereof by said cam disks; an operating shaft journaled midway of the side bars of the frame; means provided upon the operating shaft and adapted when operated to simultaneously rotate the inner shafts for moving the cam disks to guide the guiding elements of the spokes in the guides therein; and manually operative means provided upon the operating shaft and adapted to operate the means for rotating said inner shaft.

5. In a variable speed gear; in combination; a frame having two side bars; two expansion pulleys each arranged between the ends of the side bars and each having a drum; two interfitting segmental rims, each provided upon one of the pulleys; a plurality of pairs of spokes, each spoke having one end thereof formed upon one surface of one of the segments of the rims; a plurality of guiding elements each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end-plates forming the faces of both drums and arranged upon the opposed ends of each of said alined tubular shafts and recessed shafts; a plurality of adjusting devices keyed at intervals upon each of the inner shafts between the end-plates of the drums and provided with means adapted to guide the guiding elements of the spokes whereby said spokes may be adjusted to alternately expand and contract the segments of the rims of the pulleys simultaneously; a plurality of intermediate plates movably held to the cam disks each of said intermediate plates being provided upon one of its faces with means adapted to guide the spokes during adjustment thereof by said adjusting devices; an operating shaft journaled midway of the side bars of the frame; means provided upon the operating shaft and adapted when operated to simultaneously rotate the inner shafts for moving the adjusting devices to guide the guiding elements of the spokes in the guiding means thereof; and manually operative means provided upon the operating shaft and adapted to operate the means for rotating said inner shaft.

6. In a variable speed gear; in combination; a frame having two side bars; two expansion pulleys each arranged between the ends of the side bars and each having a drum; two rims, each provided upon one of the pulleys, and each consisting of a plurality of interfitting segments, each segment being formed of two curved parallelogram plates; means adapted to connect said plates; a plurality of pairs of spokes, each spoke having one end thereof formed upon one surface of one of the curved plates; a plurality of guiding elements, each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposite ends of each of said alined tubular shafts and recessed shafts; a plurality of adjusting devices keyed at intervals upon each of the inner shafts between the end-plates of the drums and having oppositely disposed cam grooves therein for reception of the guiding elements of the spokes whereby said spokes may be adjusted to alternately expand and contract the segments of the rims of the pulleys simultaneously; a projecting boss provided upon one face of each of the cam adjusting devices; a plate loosely held upon the projecting boss of each of the adjusting devices and provided upon one of its faces with means adapted to guide the spokes during adjustment thereof by said adjusting devices; an operating shaft journaled midway of the side bars of the frame; means provided upon the operating shaft and adapted when operated to simultaneously rotate the inner shafts for moving the adjusting devices to guide the guiding elements of the spokes in the cam grooves therein; and manually operative means provided upon the operating shaft and adapted to operate the means for rotating said inner shaft.

7. In a variable speed gear; in combination; a frame having two side bars; two expansion pulleys each arranged between the ends of the side bars and each having a drum; two curved segmental rims, one of which is provided upon each of the expansion pulleys and each segment of which has a substantially V-shaped end and a substantially V-shaped notch provided at the opposite end thereof; a plurality of pairs of spokes, each spoke having one end thereof formed upon one surface of one of the curved segments; a plurality of guiding elements, each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposite ends of each of said alined tubular shafts and recessed shafts; a plurality of substantially S-shaped cam disks, each having a boss projecting from one face thereof said disks being keyed at intervals upon each of the inner shafts between the end-plates of the drums and having oppositely disposed curved cam grooves therein for reception of the guiding elements of the spokes whereby said spokes may be adjusted to alternately expand and contract the segments of the rims of the pulleys simultaneously; an operating shaft journaled midway of the side bars of the frame; a plate loosely held upon the projecting boss of each of the S-shaped cam disks and provided upon one of its faces with two parallel-arranged guides adapted to guide the spoke during adjustment thereof by said S-shaped cam disks; means provided upon the operating shaft and adapted when operated to simultaneously rotate the inner shafts for moving the S-shaped cam disks to guide the guiding elements of the spokes in the curved cam grooves; and manually operative means provided upon the operating shaft and adapted to operate the means for rotating said inner shaft.

8. In a variable speed gear; in combination; a frame having two side bars; two expansion pulleys each arranged between the ends of the side bars and each having a drum; two curved segmental rims, one of which is provided upon each of the pulleys and each segment of which has a substantially V-shaped end and a substantially V-shaped notch provided at the opposite end thereof; a plurality of pairs of spokes, each spoke having one end thereof formed upon one surface of one of the curved segments; a plurality of guiding elements, each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; end plates forming the faces of both drums and arranged upon the opposed ends of each of said alined tubular shafts and recessed shafts; a plurality of cam disks, each having a boss projecting from one face thereof, said disks being keyed at intervals upon each of the inner shafts between the end-plates of the drums and each of said cam disks having two oppositely disposed curved guides provided in one face thereof and adapted to adjust the guiding elements of the spokes to alternately expand and contract the segments of the rims of the pulleys simultaneously; a plate loosely held upon the projecting boss of each of the cam disks and provided upon one of its faces with two parallel arranged guides adapted to guide the spokes during adjustment thereof by said cam disks; an operating shaft journaled midway of the side bars of the frame; means provided upon the operating shaft and adapted when operated to simultaneously rotate the inner shafts for moving the cam disks to guide the guiding element of the spokes in the curved guides; and manually operative means provided upon the operating shaft and adapted to operate the means for rotating said inner shaft.

9. In a variable speed gear; in combination; a frame having two side bars; two expansion pulleys each arranged between the ends of the side bars and each having a drum; two curved segmental rims, each provided upon one of the expansion pulleys and each segment of which has a substantially V-shaped end and a substantially V-shaped notch provided at the opposite end thereof; a plurality of pairs of spokes, each spoke having one end thereof formed upon one surface of one of the curved segments and the spokes of each pair being disposed in spaced-apart parallel arrangement; a plurality of guiding elements, each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end-plates forming the faces of both drums and arranged upon the opposed ends of each of said alined tubular shafts and recessed shafts; a plurality of disks, each having a boss projecting from one face thereof said disks being keyed at intervals upon each of the inner shafts between the end-plates of the drums and each of said disks having a substantially S-shaped groove therein for the reception of the guiding elements of the spokes whereby said spokes may be adjusted to alternately expand and contract the segments of the rims of the pulleys simultaneously; a plurality of intermediate plates and middle plates arranged between the disks and loosely held upon the respective projecting bosses thereof, each of said plates being provided with two parallel-arranged guides upon one of its faces for guiding the spokes during adjustment thereof by said disks; an operating shaft journaled midway of the side bars of the frame; means provided upon the operating shaft and adapted when operated to simultaneously rotate the inner shafts for moving the disks to guide the guiding elements of the spokes in the S-shaped grooves; and manually operative means provided upon the operating shaft and adapted to operate the means for rotating said inner shaft.

10. In a variable speed gear; in combination; a frame having two side bars; two expansion pulleys each arranged between the ends of the side bars and each having a drum; two rims, each provided upon one of the pulleys, and each consisting of a plurality of interfitting segments, formed of two curved parallelogram plates; means adapted to connect said plates; a plurality of spokes, each spoke having one end formed upon one surface of one of the curved plates; a plurality of guiding elements, each provided at the opposite end of one of the spokes; two tubular shafts and two recessed shafts, one of the tubular shafts and one of the recessed shafts being journaled in alinement at the opposite ends of the side bars of said frame; an anti-friction bearing, provided in the recess of each of the recessed shafts and in the one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of disks each having a boss projecting from one face thereof said disks being keyed at intervals upon each of the inner shafts between the end-plates of the drums and each of said disks having a substantially S-shaped groove therein for reception of the guiding elements of the spokes whereby said spokes may be adjusted to alternately expand and contract the segments of the rims of the pulleys simultaneously; a plurality of intermediate plates and middle plates arranged between the disks and loosely held upon the respective projecting boss thereof, each of said plates being provided with two parallel arranged guides upon one of its faces for guiding the spokes during adjustment thereof by said disks; an operating shaft journaled midway of the side bars of the frame; means provided upon the operating shaft and adapted when operated to simultaneously rotate the inner shafts for moving the disks to guide the guiding elements of the spokes in the S-shaped grooves; and manually operative means provided upon the operating shaft and adapted to operate the means for rotating said inner shaft.

11. In a variable speed gear; in combination; a frame having two side bars; two expansion pulleys each arranged between the ends of the side bars and each having a drum; two interfitting segmental rims, each provided upon one of the pulleys; a plurality of pairs of spokes, each spoke having one end thereof formed upon one surface of one of the segments of the rim; a plurality of guiding elements, each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of substantially S-shaped cam disks each having a boss projecting from one face thereof said disks being keyed at intervals upon each of the inner shafts between the end-plates of the drums and having oppositely-disposed curved cam grooves therein for reception of the guiding elements of the spokes whereby said spokes may be adjusted to alternately expand and contract the segments of the rims of the pulleys simultaneously; a plurality of intermediate plates and middle plates arranged between the S-shaped cam disks and loosely held upon the respective projecting bosses thereof each of said plates being provided with two parallel arranged guides upon one of its faces for guiding the spokes during adjustment thereof by said S-shaped disks; an operating shaft journaled midway of the side bars of the frame; means provided upon the operating shaft and adapted when operated to simultaneously rotate the inner shafts for moving the S-shaped disks to guide the guiding elements of the spokes in the curved cam grooves; and manually operative means provided upon the operating shaft and adapted to operate the means for rotating said inner shaft.

12. In a variable speed gear; in combination; a frame having two side bars; two expansion pulleys each arranged between the ends of the side bars and each having a drum; two rims, each provided upon one of the pulleys and each consisting of a plurality of interfitting segments formed of two curved parallelogram plates having corresponding projecting flanges connected by bolts; a plurality of spokes, each spoke having one end formed upon one surface of one of the curved plates; a plurality of lugs, each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing, of the corresponding alined tubular shaft; end plates forming the faces of both drums and arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved cam grooves for reception of the lugs of the spokes whereby said spokes may be adjusted to alternately expand and contract the segments of the rims of the pulleys simultaneously; an operating shaft journaled midway of the side bars of the frame; means provided upon the operating shaft and adapted when operated to simultaneously rotate the inner shafts for moving the adjusting devices to guide the lugs of the spokes in the curved cam grooves, and manually operative means provided upon the operating shaft and adapted to operate the means for rotating said inner shaft.

13. In a variable speed gear; in combination; a frame having two side bars; two expansion pulleys each arranged between the ends of the side bars and each having a drum; two rims, each provided upon one of the pulleys and each consisting of a plurality of interfitting segments formed of two curved parallelogram plates having corresponding projecting flanges connected by bolts; a plurality of spokes, each spoke having one end formed upon one surface of one of the curved plates; a plurality of recessed lugs, each provided at the opposite end of one of the spokes; a plurality of buffers each held in the recess of one of the lugs; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed cam grooves therein for reception of the lugs and buffers of the spokes whereby said spokes may be adjusted to alternately expand and contract the segments of the rims of the pulleys simultaneously; an operating shaft journaled midway of the side bars of the frame; guiding means arranged between each of the S-shaped disks and adapted to coöperate with the cam grooves thereof to guide the spokes during adjustment by said S-shaped disks; means provided upon the operating shaft and adapted when operated to simultaneously rotate the inner shafts for moving the S-shaped disks to guide the recessed lugs and buffers of the spokes in the cam grooves of said S-shaped disks; and manually operative means provided upon the operating shaft and adapted to operate the means for rotating said inner shaft.

14. In a variable speed gear; in combination; a frame having two side bars; two expansion pulleys each arranged between the ends of the side bars and each having a drum; two rims, each provided upon one of the pulleys, and each consisting of a plurality of interfitting segments, formed of two curved parallelogram plates having corresponding projecting flanges connected by bolts; a plurality of spokes, each spoke having one end formed upon one surface of one of the curved plates; a plurality of recessed lugs, each provided at the opposite end of one of the spokes; a plurality of buffers, each movably held within the recess of the lug; a plurality of springs, each seated in said recess and normally serving to force the buffer outwardly; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves therein whereby said spokes may be adjusted to alternately expand and contract the segments of the rims of the pulleys simultaneously; a plurality of intermediate and middle plates arranged between the S-shaped disks and loosely held upon the respective projecting bosses thereof, said intermediate and middle plates being bolted to the end-plates of the drums and each being provided with two parallel-arranged guides upon one of its faces for guiding the spokes during adjustment thereof by said S-shaped disks; an operating shaft journaled midway of the side bars of the frame; means provided upon the operating shaft and adapted when operated to simultaneously rotate the inner shafts for moving the S-shaped disks to guide the recessed lugs and buffers of the spokes in the curved cam grooves of said S-shaped disks; and manually operative means provided upon the operating shaft and adapted to operate the means for rotating said inner shaft.

15. In a variable speed gear; in combination; a frame having two side bars; two expansion pulleys each arranged between the ends of the side bars and each having a drum; two rims, each provided upon one of the pulleys and each consisting of a plurality of interfitting segments formed of two curved parallelogram plates having corresponding projecting flanges connected by bolts; a plurality of spokes, each spoke having one end formed upon one surface of one of the curved plates; a plurality of cams, each having a recess in one edge thereof and formed upon the opposite end of one of the spokes; a plurality of buffers, each movably held in the recess of the cam; a spring seated in each recess and normally serving to force the buffer outwardly; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of adjusting devices keyed at intervals upon each of the inner shafts between the end-plates of the drums and provided with means adapted to guide the recessed cams and buffers of the spokes whereby said spokes may be adjusted to alternately expand and contract the segments of the rims of the pulleys simultaneously; a plurality of plates each held to one of the adjusting devices and adapted to be moved therewith, when the inner shaft is revolved, said plates being bolted to the end plates of the drum, and each being provided with two parallel guides upon one of its faces for guiding the spokes during adjustment thereof by said adjusting devices; an operating shaft journaled midway of the side bars of the frame; means provided upon the operating shaft and adapted when operated to simultaneously rotate the inner shafts for moving the adjusting devices to guide the recessed cams and buffers of the spokes by the guiding means of said adjusting devices; and manually operative means provided upon the operating shaft and adapted to operate the means for rotating said inner shaft.

16. In a variable speed gear; in combination; a frame having two side bars; two expansion pulleys each arranged between the ends of the side bars and each having a drum; two interfitting segmental rims, each provided upon one of the pulleys; a plurality of pairs of spokes, each having one end thereof formed upon one surface of one of the segments of the rims; a plurality of cams, each having a recess in one of its edges and formed upon the opposite end of one of the spokes; a plurality of buffers, each movably held in the recess of the cam; a spring seated in each recess and normally serving to force the buffer outwardly; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of adjusting devices keyed at intervals upon each of the inner shafts between the end-plates of the drums and having oppositely-disposed cam grooves therein for reception of the recessed cams and buffers of the spokes whereby said spokes may be adjusted to alternately expand and contract the segments of the rims of the pulleys simultaneously; a plurality of plates arranged between the adjusting devices; said plates being bolted to the end-plates of the drums, and each being provided with two parallel guides upon one of its faces for guiding the spokes during adjustment thereof by said adjusting devices; an operating shaft journaled midway of the side bars of the frame; means provided upon the operating shaft and adapted when operated to simultaneously rotate the inner shafts for moving the adjusting devices to guide the recessed cams and the buffers of the spokes in the cam grooves of said adjusting devices; and manually operative means provided upon the operating shaft and adapted to operate the means for rotating said inner shaft.

17. In a variable speed gear; in combination; a frame having two side bars; two expansion pulleys each arranged between the ends of the side bars and each having a drum; two interfitting segmental rims, each provided upon one of the pulleys; a plurality of pairs of spokes, each spoke having one end formed upon one surface of one of the segments of the rims; a plurality of cams, each provided at the opposite end of one of the spokes and having a recess therein; a plurality of buffers, each movably held in the recess of the cam; a spring seated in each recess and normally serving to force the buffer outwardly; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of cam disks keyed at intervals upon each of the inner shafts between the end-plates of the drums and having oppositely disposed curved cam grooves for reception of the cams and buffers of the spokes whereby said spokes may be adjusted to alternately expand and contract the segments of the rims of the pulleys simultaneously; a plurality of plates arranged between the cam disks, said plates being bolted to the end plates of the drums, and each being provided with two parallel guides upon one of its faces for guiding the spokes during adjustment thereof by said cam disks; an operating shaft journaled midway of the side bars of the frame; means provided upon the operating shaft and adapted when operated to simultaneously rotate the inner shafts for moving the cam disks to guide the recessed cams and buffers of the spokes in the curved cam grooves of said cam disks; and manually operative means provided upon the operating shaft and adapted to operate the means for rotating said inner shaft.

18. In a variable speed gear; in combination; a frame having two side bars; two expansion pulleys each arranged between the ends of the side bars and each having a drum; two curved segmental rims, each provided upon one of the pulleys and each segment of which has a substantially V-shaped end and a substantially V-shaped notch provided at the opposite end thereof; a plurality of pairs of spokes, each spoke having one end formed upon one surface of one of the curved segments; a plurality of cams, each provided at the opposite end of one of the spokes and having a recess therein; a plurality of buffers, each movably held in the recess of the cam; a spring seated in each recess and normally serving to force the buffer outwardly; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of disks, each having a boss projecting from one face thereof said disks being keyed at intervals upon each of the inner shafts between the end-plates of the drums and having oppositely-disposed cam grooves therein for reception of the cams and buffers of the spokes whereby said spokes may be adjusted to alternately expand and contract the segments of the rims of the pulleys simultaneously; a plurality of intermediate plates and middle plates arranged between the disks and loosely held upon the respective projecting bosses thereof, each of said plates being provided with two parallel arranged guides upon one of its faces for guiding the spokes during adjustment thereof by said disks; an operating shaft journaled midway of the side bars of the frame; means provided upon the operating shaft and adapted when operated to simultaneously rotate the inner shafts for moving the disks to guide the recessed cams and buffers of the spokes in the cam grooves of said disks; and manually operative means provided upon the operating shaft and adapted to operate the means for rotating said inner shaft.

19. In a variable speed gear; in combination; a frame having two side bars; two expansion pulleys each arranged between the ends of the side bars and each having a drum; two curved segmental rims, each provided upon one of the pulleys and each segment of which has a substantially V-shaped end and a substantially V-shaped notch provided at the opposite end thereof; a plurality of pairs of spokes, each spoke having one end formed upon one surface of one of the curved segments; a plurality of cams, each provided at the opposite end of one of the spokes and having a recess in one edge thereof; a plurality of buffers, each movably held in the recess of a cam; a spring seated in each recess and normally serving to force the buffer outwardly; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; end plates forming the faces of both drums and arranged upon the opposed ends of each of said alined tubular shafts and recessed shafts; a plurality of cam disks, each having a boss projecting from one face thereof said disks being keyed at intervals upon each of the inner shafts between the end-plates of the drums and each of said cam disks having two oppositely disposed curved guides provided in one face thereof and adapted to adjust the cams and the buffers of the spokes whereby said spokes may be adjusted to alternately expand and contract the segments of the rims of the pulleys simultaneously; plates arranged between the cam disks and loosely held upon the projecting bosses thereof, each plate being provided with two parallel arranged guides upon one of its faces for guiding the spokes during adjustment thereof by said cam disks; an operating shaft journaled midway of the side bars of the frame; means provided upon the operating shaft and adapted when operated to simultaneously rotate the inner shafts for moving the cam disks to guide the cams and buffers of the spokes in the curved guides of said cam disks; and manually operative means provided upon the operating shaft and adapted to operate the means for rotating said inner shaft.

20. In a variable speed gear; in combination; a frame having two side bars; a movable vertical bracket provided upon each of the side bars at one end thereof;

two expansion pulleys each arranged between the ends of the side bars; two interfitting segmental rims, each provided upon one of the pulleys; a plurality of pairs of spokes, each spoke having one end thereof formed upon one surface of one of the segments of the rims; a plurality of guiding elements, each provided at the opposite end of one of the spokes; two tubular shafts and two recessed shafts, one of the tubular shafts and one of the recessed shafts being journaled in the movable brackets of the side bars of the frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; two drums, having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves therein for reception of the guiding elements of the spokes whereby said spokes may be adjusted to alternately expand and contract the segments of the rims of the pulleys simultaneously; a plurality of intermediate circular plates arranged between the S-shaped disks and loosely held upon the projecting bosses thereof, each of said circular plates having a recess in one of its faces; and a plurality of parallel arranged flanges formed upon the opposite face thereof so as to provide two similarly disposed grooves in which are guided the spokes of the segmental rims when the guiding elements of the spokes are engaged by the S-shaped disks by the revolving of said inner shafts; means adapted to connect the peripheral edges of the end-plates and the intermediate plates; an operating shaft journaled midway of the side bars of the frame; means provided upon the operating shaft and adapted when operated to simultaneously rotate the inner shafts for moving the S-shaped disks to guide the guiding elements of the spokes in the curved grooves of said disks; and manually operative means provided upon the operating shaft and adapted to operate the means for rotating said inner shaft.

21. In a variable speed gear; in combination; a frame having two side bars; a vertically movable bracket provided upon each of the side bars at one end thereof; a stationary bracket provided upon each of the side bars at the opposite end thereof; two expansion pulleys each arranged between the ends of the side bars; two interfitting segmental rims, each provided upon one of the pulleys; a plurality of pairs of spokes, each spoke having one end thereof formed upon one surface of one of the segments of the rims; a plurality of guiding elements, each provided at the opposite end of one of the spokes; a tubular shaft and a recessed shaft journaled in alinement at the opposite ends of the movable vertical brackets of the side bars of said frame; a tubular shaft and a recessed shaft journaled in alinement at the ends of the stationary brackets of the side bars of the frame; an antifriction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums, having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves therein for reception of the guiding elements of the spokes whereby said spokes may be adjusted to alternately expand and contract the segments of the rims of the pulleys simultaneously; two circular middle plates, each having a recessed face, said plates being loosely held upon the projecting bosses of two of the central S-shaped disks, each of said circular middle plates having two parallel arranged grooves provided in the face thereof and communicating with said recesses of the plates and each of said plates being provided with two parallel arranged grooves upon its opposite face and disposed transversely with respect to the grooves of the recessed face thereof, said grooves being adapted to receive the spokes of the segmental rims so as to be adjusted when the guiding elements of the spokes are engaged by the S-shaped disks; means adapted to connect the peripheral edges of the end-plates and the middle plates; an operating shaft journaled midway of the side bars of the frame; means provided upon the operating shaft and adapted when operated to simultaneously rotate the inner shafts for moving the S-shaped disks to guide the guiding elements of the spokes in the curved grooves of said S-shaped disks; and manually operative means provided upon the operating shaft and adapted to operate the means for rotating said inner shaft.

22. In a variable speed gear; in combination; a frame having two side bars; a movable vertical bracket provided upon each of the side bars at one end thereof; a stationary bracket provided upon each of the side bars at the opposite end thereof; two interfitting segmental rims, each provided upon one of the pulleys; a plurality of pairs of spokes, each spoke having one end formed upon one surface of one of the segments of the rims; a plurality of guiding cams, each provided at the opposite end of one of the spokes; a tubular shaft and a recessed shaft, being journaled in alinement at the opposite ends of the movable vertical bracket of the side bars of said frame; a tubular shaft and a recessed shaft, each having one end journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; two drums, having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed cam grooves for reception of the guiding cams of the spokes; a plurality of circular intermediate plates each arranged between two of the S-shaped disks and loosely held upon the projecting bosses thereof, each of said circular plates having a recess in one of its faces and two parallel arranged grooves in the opposite face thereof; two circular middle plates, each having a recessed face and said circular middle plates being loosely held upon the projecting bosses of two of the central cam shaped disks and each of said circular middle plates having two parallel arranged grooves communicating with said recesses of the plates and having two parallel arranged grooves provided upon the opposite face thereof and disposed transversely with respect to the grooves of the recessed face thereof, all the grooves of said circular middle plates and intermediate plates being adapted to receive the spokes of the segmental rim so as to be adjusted when the guiding cams of the spokes are engaged by the S-shaped disks; means adapted to connect the peripheral edges of the end plates, the intermediate plate and the middle plates; an operating shaft journaled midway of the side bars of the frame; means provided upon the operating shaft and adapted when operated to simultaneously rotate the inner shafts for moving the S-shaped disks to guide the guiding cams of the spokes in the cam grooves of said S-shaped disks; and manually operative means provided upon the operating shaft and adapted to operate the means for rotating said inner shaft.

23. In a variable speed gear; in combination; a frame having two side bars; a vertically disposed movable bracket provided upon each of the side bars at one end thereof; a stationary bracket provided upon each of the side bars at the opposite end thereof; two expansion pulleys each arranged between the ends of the side bars; two curved segmental rims, each provided upon one of the pulleys and each segment of which has a substantially V-shaped end and a substantially V-shaped notch provided at the opposite end thereof; a plurality of pairs of spokes, each spoke having one end thereof formed upon one surface of one of the curved segments; a plurality of guiding cams, each provided at the opposite end of one of the spokes; a tubular shaft and a recessed shaft, each having one end journaled in alinement at the opposite ends of the vertically disposed movable brackets of the side bars of said frame; a tubular shaft and a recessed shaft, being journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums, having end plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of intermediate plates arranged between the S-shaped disks and loosely held upon the projecting bosses thereof, each of said plates being provided with two parallel arranged grooves upon one of its faces and adapted to receive the spokes so as to be guided therein when the guiding cams of the spokes are engaged by the S-shaped disks; means adapted to connect the peripheral edges of the end-plates and all of said intermediate plates; a bracket provided upon each of the opposite ends of one of the side bars and having a bearing in which is journaled the opposite end of each of the inner shafts; a spirally grooved jacket rigidly secured to the inner shafts between the side bar and the bearing of said bracket; an operating shaft journaled midway of the side bars of the frame; two adjusting levers, each having substantially the central part thereof pivotally held upon the operating shaft; means provided at one end of each of the adjusting levers and adapted when said adjusting levers are moved to simultaneously rotate the spirally grooved jackets and the inner shafts for moving the S-shaped disks to guide the guiding cams of the spokes in the curved grooves of said S-shaped disks; and manually operative means provided upon the operating shaft and adapted to move the adjusting levers for operating the means at the ends thereof to rotate said inner shafts.

24. In a variable speed gear; in combination; a frame having two side bars; a vertically disposed movable bracket provided upon each of the side bars at one end thereof; a stationary bracket provided upon each of the side bars at the opposite end thereof; two expansion pulleys each arranged between the ends of the side bars; two curved segmental rims, each provided upon one of the pulleys and each segment of which has a substantially V-shaped end and a substantially V-shaped notch provided at the opposite end thereof; a plurality of pairs of spokes, each spoke having one end thereof formed upon one surface of one of the curved segments; a plurality of guiding cams, each provided at the opposite end of one of the spokes; a tubular shaft and a recessed shaft journaled in alinement at the opposite ends of the vertically disposed movable brackets of the side bars of said frame; a tubular shaft and a recessed shaft journaled in alinement at the ends of the stationary brackets of the side bars of said frame; an anti-friction bearing provided in the recess of each of the recessed shafts and in one end of the tubular shafts; two inner shafts, each having one end rotatably held in the anti-friction bearing of one of the recessed shafts and the other end rotatable in the anti-friction bearing in the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of plates arranged between the S-shaped disks and loosely held upon the projecting bosses thereof each of said plates having a plurality of guiding grooves provided in one face thereof and adapted to receive the spokes so as to be adjusted therein when the guiding cams of the spokes are engaged by the S-shaped disks; means adapted to connect the peripheral edges of the end-plates and all of said plates within the drum; a bracket provided upon each of the opposite ends of one of the side bars and having a bearing in which is journaled the opposite end of one of the inner shafts; a spirally-grooved jacket rotatably held upon each of the inner shafts between one of the side bars of the frame and the bearing of said bracket; a sleeve movable upon each of the grooved jackets and having two teeth upon the interior surface thereof and adapted to engage the grooves of one of the grooved jackets; an operating shaft journaled midway of the side bars of the frame; two adjusting levers, each having substantially the central part thereof pivotally held upon the operating shaft and having one end pivotally held to one end of one of the side bars of the frame; means provided at the opposite end of each of the adjusting levers and adapted when said adjusting levers are moved to simultaneously rotate the spirally grooved jackets and the inner shafts for moving the S-shaped disks to guide the guiding cams of the spokes in the curved grooves of said S-shaped disks; and manually operative means provided upon the operating shaft and adapted to move the adjusting levers.

25. In a variable speed gear; in combination; a frame having two side bars; a vertically-disposed movable bracket provided upon each of the side bars at one end thereof; a stationary bracket provided upon each of the side bars at the opposite end thereof; two expansion pulleys each arranged between the ends of the side bars; two curved segmental rims, each provided upon one of the pulleys and each segment of which has a substantially V-shaped end and a substantially V-shaped notch provided at the opposite end thereof; a plurality of pairs of spokes, each spoke having one end thereof formed upon one surface of one of the curved segments; a plurality of guiding cams, each provided at the opposite end of one of the spokes; a tubular shaft and a recessed shaft journaled in alinement at the opposite ends of the vertically disposed movable brackets of the side bars of said frame; a tubular shaft and a recessed shaft journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums having end-plates arranged upon the opposed ends of each of said alined tubular shafts and recessed shafts, a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of plates arranged between the S-shaped disks and loosely held upon the projecting bosses thereof, each of said plates having a plurality of guiding grooves provided in one face thereof and adapted to receive the spokes so as to be guided therein when the guiding cams of the spokes are engaged by the S-shaped disks; means adapted to connect the peripheral edges of the end-plates and all of said plates within each of the drums; a bracket provided upon each of the opposite ends of one of the side bars and having a bearing in which is journaled the opposite end of one of the inner shafts; a spirally grooved jacket rotatably held upon each of the inner shafts between one of the side bars of the frame and the bearing of said bracket; a sleeve movable upon each of the grooved jackets and having two teeth upon the interior surface thereof adapted to engage the grooves of one of the grooved jackets, said sleeve having a grooved exterior surface; a collar rotatably held in the groove of each sleeve and having oppositely projecting pins; an operating shaft journaled midway of the side bars of the frame; two adjusting levers, each having substantially the central part thereof pivotally held upon the operating shaft and having one end pivotally held to one end of one of the side bars of the frame; a yoke provided upon the opposite end of each of the adjusting levers and movably held upon the pins of one of the collars; and manually operative means provided upon the operating shaft and adapted to move the adjusting levers.

26. In a variable speed gear; in combination; a frame having two side bars; a vertically-disposed movable bracket provided upon each of the side bars at one end thereof; a stationary bracket provided upon each of the side bars at the opposite end thereof; two expansion pulleys each arranged between the ends of the side bars; two curved segmental rims, each provided upon one of the pulleys and each segment of which has a substantially V-shaped end and a substantially V-shaped notch provided at the opposite end thereof; a plurality of pairs of spokes, each spoke having one end thereof formed upon one surface of one of the curved segments; a plurality of guiding cams, each provided at the opposite end of one of the spokes; a tubular shaft and a recessed shaft journaled in alinement at the opposite ends of the vertically disposed movable brackets of the side bars of said frame; a tubular shaft and a recessed shaft journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of plates arranged between the S-shaped disks and loosely held upon the projecting bosses thereof each of said plates having a plurality of guiding grooves provided in one face thereof and adapted to receive the spokes so as to be guided therein when the guiding cams of the spokes are engaged by the S-shaped disks; means adapted to connect the peripheral edges of the end-plates and all of said plates within each of the drums; a bracket provided upon each of the opposite ends of one of the side bars and having a bearing in which is journaled the opposite end of one of the inner shafts; a spirally grooved jacket rotatably held upon each of the inner shafts between one of the side bars of the frame and the bearing of said bracket; a sleeve movable upon each of the grooved jackets and each having two teeth upon the interior surface thereof and adapted to engage the grooves of one of the grooved jackets, said sleeve having an exterior grooved surface; a collar rotatably held in the groove of each of the sleeves and having oppositely-projecting pins; an operating shaft journaled midway of the side bars of the frame and having a threaded part projecting some distance outwardly from one of said side bars; a bracket provided upon the same side bar and having a head in which is journaled the end of the threaded part of the shaft; two adjusting levers, each having substantially the central part thereof pivotally held upon the operating shaft; a plurality of links, each having one end pivoted to one end of the side bar of the frame and having the opposite end thereof movably held to one end of one of the adjusting levers; a yoke provided upon the opposite end of each of the levers and movably held upon the pins of one of the collars; means provided upon the threaded part of the operating shaft and adapted to adjust the adjusting levers; and manually operative means provided upon the operating shaft and adapted to move the adjusting means to adjust the adjusting levers.

27. In a variable speed gear; in combination; a frame having two side bars; a vertically disposed movable bracket provided upon each of the side bars at one end thereof; a stationary bracket provided upon each of the side bars at the opposite end thereof; two expansion pulleys each arranged between the ends of the side bars; two curved segmental rims, each provided upon one of the pulleys and each segment of which has a substantially V-shaped end and a substantially V-shaped notch provided at the opposite end thereof; a plurality of pairs of spokes, each spoke having one end formed upon one surface of one of the curved segments; a plurality of guiding cams, each provided at the opposite end of one of the spokes; a tubular shaft and a recessed shaft journaled in alinement at the opposite ends of the movable vertical brackets of the side bars of said frame; a tubular shaft and a recessed shaft journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of plates arranged between the S-shaped disks and loosely held upon the projecting bosses thereof, each of said plates having a plurality of guiding grooves provided in one face thereof and adapted to receive the spokes so as to be guided therein when the guiding cams of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; a spirally grooved jacket rotatably held upon each of the inner shafts between one of the side bars of the frame and the bearing of said bracket; a sleeve movable upon each of the grooved jackets and each having two teeth upon the interior surface thereof and adapted to engage the grooves of one of the grooved jackets, said sleeve having an exterior grooved surface; a collar rotatably held in the groove of each of the sleeves and having oppositely-projecting pins; an anti-friction bearing provided between each wall of the groove of each sleeve and each edge of the collar; an operating shaft journaled midway of the side bars of the frame and having a threaded part projecting some distance outwardly from one of said side bars; a bracket provided upon the same side bar and having a head in which is journaled the end of the threaded part of the shaft, said bracket having a slot formed in the arm thereof; a threaded nut movably held upon the threaded part of the shaft and having two oppositely-disposed pins one of which is guided in the slot of the arm of the bracket; two adjusting levers each having substantially the central part thereof pivotally held upon one of the pins of said nut; a plurality of links, each having one end pivoted to one end of the side bar of the frame and having the opposite end thereof movably held to one end of one of the adjusting levers; two apertured curved arms provided upon the opposite ends of the levers and movably held upon the pins of the collars; and manually operative controlling means provided upon the operating shaft and adapted to move the nut upon said shaft to adjust the adjusting levers.

28. In a variable speed gear; in combination; a frame having two side bars; a vertically disposed movable bracket provided upon each of the side bars at one end thereof; a stationary bracket provided upon each of the side bars at the opposite end thereof; two expansion pulleys each arranged between the ends of the side bars and each having a curved interfitting segmental rim, each segment of said rim having a substantially V-shaped end and a substantially V-shaped notch provided at the opposite end thereof; a plurality of pairs of spokes, each spoke having one end formed upon one surface of one of the curved segments; a belt guided over the segmental rim of each of the expansion pulleys; a plurality of guiding cams, each provided at the opposite end of one of the spokes; a tubular shaft and a recessed shaft journaled in alinement at the opposite ends of the vertical movable brackets of the side bars of said frame; a tubular shaft and a recessed shaft journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums, having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of plates arranged between the S-shaped disks and loosely held upon the projecting bosses thereof each of said plates having a plurality of guiding grooves provided in one face thereof and adapted to receive the spokes so as to be guided therein when the guiding cams of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; a spirally grooved jacket rotatably held upon each of the inner shafts between the side bar of the frame and the bearing of said bracket; a sleeve movable upon each of the grooved jackets, and having two teeth formed upon the interior thereof and adapted to engage the grooves of one of the grooved jackets, said sleeve also provided with a groove in the exterior surface thereof; a collar rotatably held in the groove of each of the sleeves and having oppositely projecting pins; an anti-friction bearing provided between each wall of the groove of each sleeve and each edge of the collar; an operating shaft journaled midway of the side bars of the frame and having a threaded portion projecting some distance outwardly from one of said side bars; a bracket provided upon the same side bar and having a head in which is journaled the end of the threaded portion of the shaft, said bracket having a slot formed in the arm thereof; a threaded nut movably held upon the threaded portion of the shaft and having two oppositely disposed pins, one of which is guided in the slot of the arm of the bracket; two adjusting levers, each having substantially the central part thereof pivotally held upon one of the pins of said nut, links, each pivoted to one of the opposed ends of one of the side bars of the frame and having its other end pivoted to one of the adjusting levers; two apertured curved arms provided upon the opposite ends of the levers and movably held upon the pins of the collars; means provided upon the operating shaft and connected to the recessed shafts and tubular shafts journaled in the movably vertical brackets and adapted to take up the slack of the belt; and manually operative controlling means provided upon the operating shaft and adapted to move the nut upon said shaft to adjust the adjusting levers simultaneously with operating the means for taking up the slack of the belt.

29. In a variable speed gear; in combination; a frame having two side bars; a vertically-disposed movable bracket provided upon each of the side bars at one end thereof; a stationary bracket provided upon each of the side bars at the opposite end thereof; two expansion pulleys each arranged between the ends of the side bars and each having a curved segmental rim, each segment of said rim having a substantially V-shaped end and a substantially V-shaped notch provided at the opposite end thereof; a plurality of pairs of spokes, each spoke having one end formed upon one surface of one of the curved segments; a belt guided over the segmental rims of the expansion pulleys; a plurality of cams, each provided at the opposite end of one of the spokes; a tubular shaft and a recessed shaft journaled in alinement at the opposite ends of the movable vertical brackets of the side bars of said frame; a tubular shaft and a recessed shaft journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing of the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of plates arranged between the S-shaped disks and loosely held upon the projecting bosses thereof each of said plates having a plurality of guiding grooves provided in one face thereof and adapted to receive the spokes so as to be guided therein when the guiding cams of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; means provided upon each of the inner shafts and adapted to move said shafts so as to rotate the S-shaped disks; an operating shaft journaled midway of the side bars of the frame, said operating shaft having a threaded portion projecting some distance outwardly from one of said side bars and having the portions between said side bars partly threaded; a bracket provided upon one of the side bars and having a head in which is journaled the end of the threaded projecting portion of the shaft; links pivoted at the opposed ends of one of the side bars of the frame; two adjusting levers, each having one end movably held to one of the links; a yoke provided upon the opposite end of each of the adjusting levers and having two apertured curved arms and adapted to move the means for rotating said inner shafts; means provided upon the threaded projecting portion of the operating shaft and adapted to adjust the adjusting levers; a sleeve having two spaced apertured lugs pivotally held upon the recessed shaft journaled in one of the vertical brackets; a sleeve having two spaced apertured lugs loosely held upon the tubular shaft journaled in the other vertical bracket; a threaded nut provided upon each of the threaded portions of the operating shaft between the side bars of the frame, each of said nuts having two obliquely-disposed spaced lugs provided upon the top surface thereof; two adjusting arms, one having one end pivotally held between the lugs of the sleeve upon the recessed shaft and the other having one end pivotally held between the lugs upon the sleeve of the tubular shaft and each having the opposite end thereof held between the spaced lugs of the obliquely-disposed lugs of said nuts; two pulleys provided upon each of the side bars of the frame and adapted to guide the movement of the adjusting arms; and manually operative controlling means provided upon the operating shaft and adapted to move the means to adjust the adjusting levers and move the nuts to the adjusting arms for taking up the slack of the belt.

30. In a variable speed gear; in combination; a frame having two side bars; two expansion pulleys arranged between the ends of the side bars and each having a curved interfitting segmental rim; a belt guided over the rims; a plurality of pairs of spokes each spoke having one end formed upon one surface of one of the curved segments of the rim; a plurality of guiding cams, each provided at the opposite end of one of the spokes; two tubular shafts and two recessed shafts, one of the tubular shafts and one of the recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of plates arranged between the S-shaped disks and loosely held upon the projecting bosses thereof each of said plates having a plurality of guiding grooves provided in one face thereof and adapted to receive the spokes so as to be guided therein when the guiding cams of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; a spirally grooved jacket rotatably held upon each of the inner shafts between the side bar of the frame and the bearing of said bracket; a sleeve movable upon each of the grooved jackets, each of said sleeves having two teeth formed upon the interior thereof and adapted to engage the grooves of one of the grooved jackets, each of said sleeves also provided with a groove in the exterior surface thereof; a collar rotatably held in the groove of each of the sleeves and having oppositely projecting pins; an operating shaft journaled midway of the side bars of the frame and having a threaded portion projecting some distance outwardly from one of said side bars; a bracket provided upon the same side bar and having a head in which is journaled the end of the threaded portion of the shaft, said bracket having a slot formed in the arm thereof; a threaded nut movably held upon threaded portion of the shaft and having two oppositely-disposed pins one of which is guided in the slot of the arm of the bracket; two adjusting levers, each having substantially the central part thereof pivotally held upon the pins of said nut; links, each having one end pivoted at one of the opposed ends of the side bar of the frame and having its other end movably held to one of the adjusting levers; two apertured curved arms provided upon the opposite ends of the levers and movably held upon the pins of the collars; means provided upon the operating shaft and connected to one of the recessed shafts and one of the tubular shafts and adapted to take up the slack of the belt;

and manually operative controlling means provided upon the operating shaft and adapted to move the nut upon said shaft to adjust the adjusting levers simultaneously with operating the means for taking up the slack of the belt.

31. In a variable speed gear; in combination; a frame having two side bars; two expansion pulleys arranged between the ends of the side bars and each having a curved interfitting segmental rim; a belt guided over the rims; a plurality of pairs of spokes, each spoke having one end formed upon one surface of one of the curved segments; a plurality of guiding cams, each provided at the opposite end of one of the spokes, a buffer provided in one edge of each of the spokes; two tubular shafts and two recessed shafts, one of the tubular shafts and one of the recessed shafts being journaled in alinement at the opposite ends of the side bars of said frame; two inner shafts, each having one end rotatably held in one of the recessed shafts and the other end rotatable in the corresponding alined tubular shaft; two drums having end plates arranged upon the opposed ends of each of said alined tubular shafts and recessed shafts; a plurality of adjusting devices keyed at intervals upon each of the inner shafts between the end-plates of the drums and having oppositely-disposed curved grooves for reception of the guiding cams and buffers of the spokes; a plurality of plates arranged between the adjusting devices, each of said plates being provided with a plurality of guides upon one of its faces for guiding the spokes when the cams and buffers of the spokes are engaged by the adjusting devices; means adapted to connect the peripheral edges of the end-plates and all of said plates within the drums; a bracket provided upon each of the opposite ends of one of the side bars and having a bearing in which is journaled the opposite end of one of the inner shafts; a spirally-grooved jacket rotatably held upon each of the inner shafts between the side bar of the frame and the bearing of said bracket; a sleeve movable upon each of the grooved jackets, and each of said sleeves having two teeth formed upon the interior thereof and adapted to engage the grooves of one of the grooved jackets, each of said sleeves also provided with a groove in the exterior surface thereof; a collar rotatably held in the groove of each of the sleeves and having oppositely projecting pins; an anti-friction bearing provided between each wall of the groove of each sleeve and each edge of the collar; an operating shaft journaled midway of the side bars of the frame and having a threaded portion projecting some distance outwardly from one of said side bars; a bracket provided upon the same side bar and having a head in which is journaled the end of the threaded portion of the shaft, said bracket having a slot formed in the arm thereof; a threaded nut movably held upon the threaded portion of the shaft and having two oppositely disposed pins, one of which is guided in the slot of the arm of the bracket; two adjusting levers, each having substantially the central part thereof pivotally held upon one of the pins of said nut; links, each having one end pivoted at one of the opposed ends of the side bar of the frame and having its other end movably held to one of the adjusting levers; two apertured curved arms provided upon the opposite ends of the levers and movably held upon the pins of the collars; means provided upon the operating shaft and connected to one of the recessed shafts and one of the tubular shafts and adapted to take up the slack of the belt; a grooved toothed wheel keyed upon the threaded portion of the operating shaft adjacent to one of the side bars of the frame; a chain trained in said groove by which the wheel may be manually rotated to move the nut upon said operating shaft to adjust the adjusting levers simultaneously with the operating means for taking up the slack of the belt.

32. In a variable speed gear; in combination; a frame having two side bars; two expansion pulleys each arranged between the ends of the side bars and each having a curved interfitting segmental rim; a plurality of pairs of spokes, each spoke having one end formed upon one surface of one of the curved segments of the rim; a belt guided over the rim; a plurality of cams, each provided at the opposite end of one of the spokes and having a recess therein; a buffer movably held in the recess of each cam; a spring seated in each recess and normally tending to serve as a buffer; a tubular shaft and a recessed shaft journaled in alinement at the opposite ends of the side bars of said frame; two inner shafts, each having one end rotatably held in one of the recessed shafts and the other end rotatable in the corresponding alined tubular shaft; two drums having end-plates arranged upon the opposed ends of each of said alined tubular shafts and recessed shafts; a plurality of cam disks, each having a boss projecting from one face thereof said disks being keyed at intervals upon each of the inner shafts between the end-plates of the drums and having oppositely disposed curved grooves for reception of the cams of the spokes; a plurality of plates arranged between the cam disks and loosely held upon the projecting bosses thereof, each of said plates being provided with two parallel guides upon one of its faces for guiding the spokes when the cams of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; a spirally grooved jacket rotatably held upon each of the inner shafts between the side bar of the frame and the bearing of said bracket; a sleeve movable upon each of the grooved jackets, each of said sleeves having two teeth formed upon the interior thereof and adapted to engage the grooves of one of the grooved jackets, each of said sleeves also provided with a groove in the exterior surface thereof; a collar rotatably held in the groove of each of the sleeves and having oppositely-projecting pins; an anti-friction bearing provided between each wall of the groove of each sleeve and each edge of the collar; an operating shaft journaled midway of the side bars of the frame and having a threaded portion projecting some distance outwardly from one of said side bars; a bracket provided upon the same side bar and having a head in which is journaled the end of the threaded portion of the shaft, said bracket having a slot formed in the arm thereof; a threaded nut movably held upon the threaded portion of the shaft and having two oppositely disposed pins, one of which is guided in the slot of the arm of the bracket; two adjusting levers, each having substantially the central part thereof pivotally held upon one of the pins of said nut; links, each having one end pivoted at one of the opposed ends of the side bar of the frame and having its other end movably held to one end of one adjusting lever; two apertured curved arms provided upon the opposite ends of the levers and movably held upon the pins of the collars; means provided upon the operating shaft and connected to one of the recessed shafts and to one of the tubular shafts and adapted to take up the slack of the belt; a grooved toothed wheel keyed upon the threaded portion of the operating shaft adjacent to one of the side bars of the frame; a chain trained in said groove by which the wheel may be manually rotated to move the nut upon said operating shaft to adjust the adjusting levers simultaneously with the operating means for taking up the slack of the belt.

33. In a variable speed gear; in combination; a frame having two side bars; a vertically disposed movable bracket provided upon each of the side bars at one end thereof; a stationary bracket provided upon each of the side bars at the opposite end thereof; two expansion pulleys each arranged between the ends of the side bars and each having a curved segmental rim, each segment of said rim having a substantially V-shaped end and a substantially V-shaped notch provided at the opposite end thereof; a plurality of pairs of spokes, each spoke having one end formed upon one surface of one of the curved segments; a plurality of guiding cams, each provided at the opposite end of one of the spokes and having a recess therein; a plurality of buffers, each movably held in the recess of the cam; a belt guided over the rims of the pulleys; a tubular shaft and a recessed shaft journaled in alinement at the opposite ends of the vertical movable brackets of the side bars of said frame; a tubular shaft and a recessed shaft journaled in alinement at the ends of the stationary brackets of the side bars of said frame; two inner shafts, each having one end rotatably held in one of the recessed shafts and the other end rotatable in the corresponding alined tubular shaft; two drums having end-plates arranged upon the opposed ends of each of said alined tubular shafts and recessed shafts; a plurality of disks, each having a boss projecting from one face thereof, said disks being keyed at intervals upon each of the inner shafts between the end-plates of the drums and having oppositely disposed curved grooves for reception of the guiding cams and buffers of the spokes; a plurality of intermediate plates and middle plates arranged between the disks and loosely held upon the projecting bosses thereof, each of said plates having a plurality of guiding grooves provided in one face thereof and adapted to receive the spokes so as to be guided there when the cams and buffers of the spokes are engaged by the disks; means adapted to connect the peripheral edges of the end-plates and all of said intermediate plates and middle plates; a bracket provided upon each of the opposite ends of one of the side bars and having a bearing in which is journaled the opposite end of one of the inner shafts; means provided upon each of the inner shafts and adapted to move said shafts so as to rotate the disks; an operating shaft journaled midway of the side-bars of the frame, said operating shaft having a threaded portion projecting some distance outwardly from one of said side bars and having portions between said side bars partly threaded; a bracket provided upon one of the side bars and having a head in which is journaled the end of the threaded projecting portion of the operating shaft; two adjusting levers, links, each having one end pivoted at one of the opposed ends of one of the side bars of the frame and having its other end pivoted to one of the adjusting levers; a yoke provided upon the opposite end of each of the adjusting levers and having two apertured curved arms adapted to move the means for rotating said inner shafts; means provided upon the threaded projecting portion of the operating shaft and adapted to adjust the adjusting levers; a sleeve having two spaced apertured lugs movably held upon the recessed shaft journaled in the vertical movable bracket; a sleeve having two spaced apertured lugs movably held upon the tubular shaft journaled in the other vertical bracket; a threaded nut provided upon each of the threaded portions of the operating shaft between the side bars of the frame, each of said nuts having two obliquely disposed spaced lugs provided upon the top surface thereof; two adjusting arms, one having one end pivotally held between the lugs of the sleeve upon said recessed shaft and the other having one end pivotally held between the lugs upon the sleeve of said tubular shaft and each having the opposite end thereof held between the spaced obliquely disposed lugs of said nuts; two pulleys provided upon each of the side bars of the frame and adapted to guide the movement of the adjusting arms; a grooved toothed wheel keyed upon the threaded portion of the operating shaft adjacent to one of the side bars of the frame, and a chain trained in said groove by which the wheel may be manually rotated to move the nut upon said operating shaft to adjust the adjusting levers simultaneously with the adjusting arms for taking up the slack of the belt.

34. In a variable speed gear; in combination; a frame having two side bars; two expansion pulleys each arranged between the ends of the side bars and each having a curved segmental rim; each segment of said rim having a substantially V-shaped end and a substantially V-shaped notch provided at the opposite end thereof; a plurality of pairs of spokes, each spoke having one end formed upon one surface of one of the curved segments of the rim; a plurality of guiding cams, each provided at the opposite end of one of the spokes and having a recess in one end thereof; a plurality of buffers, each movably held in the recess of the cam; a spring seated in each recess and normally serving to force the buffer outwardly; a belt guided over the rims of the pulleys; two tubular shafts and two recessed shafts, one of said tubular shafts and one of said recessed shafts being journaled in alinement at the opposite ends of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having two oppositely disposed curved grooves for reception of the guiding cams and buffers of the spokes; a plurality of plates arranged between the S-shaped disks and loosely held upon the projecting bosses thereof, each of said plates having a plurality of guiding grooves provided in one face thereof and adapted to receive the spokes so as to be guided therein when the cams and buffers of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; means provided upon each of the inner shafts and adapted to move said shafts so as to rotate the S-shaped disks; an operating shaft journaled midway of the side-bars of the frame, said operating shaft having a threaded portion projecting some distance outwardly from one of said side bars and having the portions between said side bars partly threaded; a bracket provided upon one of the side bars and having a head in which is journaled the end of the threaded projecting portion of the shaft; adjusting means operated simultaneously with the rotation of the operating shaft and adapted to operate the means for revolving the inner shafts; means provided upon the threaded projecting portion of the operating shaft and adapted to adjust said adjusting means; a sleeve movably held upon each of the recessed shafts and having two spaced apertured lugs formed upon the exterior surface thereof; a sleeve movably held upon each of the tubular shafts; and having two spaced apertured lugs formed upon the exterior surface thereof; a threaded nut provided upon each of the threaded portions of the operating shaft between the side bars of the frame, each of said nuts having two obliquely-disposed spaced lugs provided upon the top surface thereof; two adjusting arms, one having one end pivotally held between the lugs of the sleeve upon the recessed shaft and the other having one end held between the lugs upon the sleeve of the tubular shaft and each having the opposite end thereof held between the spaced obliquely-disposed lugs of said nuts; two pulleys provided upon each of the side bars of the frame and adapted to guide the movement of the adjusting arms; a grooved toothed wheel keyed upon the threaded portion of the operating shaft adjacent to one of the side bars of the frame and a cable trained in said groove by which the wheel may be manually rotated to move the means upon said operating shaft simultaneously with the adjusting arms for taking up the slack of the belt.

35. In a variable speed gear; in combination; a frame having two side bars; a vertically disposed movable bracket provided upon each of the side bars at one end thereof; a stationary bracket provided upon each of the side bars at the opposite end thereof; two expansion pulleys each arranged between the ends of the side bars and each having a curved segmental rim, each segment of said rim having a substantially V-shaped end and a substantially V-shaped notch provided at the opposite end thereof; a belt guided over the segmental rims; a plurality of pairs of spokes, each spoke having one end formed upon one surface of one of the curved segments; a plurality of guiding elements, each provided at the opposite end of one of the spokes; a tubular shaft and a recessed shaft journaled in alinement at the opposite ends of the vertical movable brackets of the side bars of said frame; a tubular shaft and a recessed shaft journaled in alinement at the ends of the stationary brackets of the side bars of said frame; two inner shafts, each having one end rotatably held in one of the recessed shafts and the other end rotatable in the corresponding alined tubular shaft; two drums; having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having two oppositely-disposed curved grooves for reception of the guiding elements of the spokes; a plurality of plates arranged between the S-shaped disks and loosely held upon the projecting bosses thereof, each of said plates having a plurality of guiding grooves provided upon one face thereof and adapted to receive the spokes so as to be guided therein when the guiding elements of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; a spirally grooved jacket held upon each of the inner shafts between the side bar of the frame and the bearing of said jacket; a sleeve movable upon each of the grooved jackets, each of said sleeves having two teeth formed upon the interior thereof and adapted to engage the grooves of one of the grooved jackets, each of said sleeves also provided with a groove in the exterior surface thereof; a collar rotatably held in the groove of each of the sleeves; an operating shaft journaled midway of the side-bars of the frame, said operating shaft having a threaded portion projecting some distance outwardly from one of said side bars and having the portion between said side bars partly threaded; a bracket provided upon one of the side bars and having a head in which is journaled the end of the threaded projecting portion of the shaft; adjusting means operated simultaneously with the rotation of the operating shaft and adapted to operate the collars to move the sleeves to rotate the spirally grooved jackets of the inner shafts; means provided upon the threaded projecting portion of the operating shaft and adapted to adjust said adjusting means; a sleeve having two spaced apertured lugs movably held upon the recessed shaft journaled in one of the vertical brackets; a sleeve having two spaced apertured lugs movably held upon the tubular shaft journaled in the other vertical bracket; a threaded nut provided upon each of the threaded portions of the operating shaft between the side bars of the frame, each of said nuts having two obliquely-disposed spaced lugs provided upon the top surface thereof; two adjusting arms, one having one end pivotally held between the lugs of the sleeve upon the recessed shaft and the other having one end pivotally held between the lugs upon the sleeve of the tubular shaft and each having the opposite end thereof held between the obliquely disposed lugs of said nuts; two pulleys provided upon each of the side bars of the frame and adapted to guide the movement of the adjusting arms; and manually operative controlling means provided upon the operating shaft and adapted to move the means to adjust the adjusting means and simultaneously move the nuts to adjust the adjusting arms for taking up the slack of the belt.

36. In a variable speed gear; in combination; a frame having two side bars; a vertically disposed movable bracket provided upon each of the side bars at one end thereof; a stationary bracket provided upon each of the side bars at the opposite end thereof; two expansion pulleys each arranged between the ends of the side bars and each having a rim, said rim consisting of a plurality of interfitting segments, each formed of two parallelogram curved plates; means adapted to connect said plates; a plurality of pairs of spokes, each spoke having one end formed upon one surface of one of the segments of the rim; a plurality of guiding cams, each provided at the opposite end of one of the spokes; a belt guided over the rims of the pulleys; a tubular shaft and a recessed shaft, journaled in alinement at the opposite ends of the vertical movable brackets of the side bars of said frame; a tubular shaft and a recessed shaft journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having a plurality of curved grooves for reception of the guiding cams of the spokes; a plurality of plates arranged between the S-shaped disks and loosely held upon the projecting bosses thereof, each of said plates having a plurality of guiding grooves provided upon one face thereof and adapted to receive the spokes so as to be guided therein when the guiding cams of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; a spirally grooved jacket rotatably held upon each of the inner shafts between the side bar of the frame and the bearing of said bracket; a sleeve movable upon each of the grooved jackets, and each having two teeth formed upon the interior thereof and adapted to engage the grooves of one of the grooved jackets, each of said sleeves also provided with a groove in the exterior surface thereof; a collar rotatably held in the groove of each of the sleeves and having oppositely projecting pins; an anti-friction bearing provided between each wall of the groove of each sleeve and each edge of the collar; an operating shaft journaled midway of the side bars of the frame and having a threaded portion projecting some distance outwardly from one of said side bars; a bracket provided upon the same side bar and having a head in which is journaled the end of the threaded portion of the shaft, said bracket having a slot formed in the arm thereof; two adjusting levers, links, each having one end pivoted at one of the opposed ends of one of the side bars of the frame and having its other end movably held to one end of one of the levers; two apertured curved arms provided upon the opposite ends of the levers and movably held upon the pins of the collars; means provided upon the threaded projecting portions of the operating shaft and connected to the central part of each of the adjusting levers, said means being adapted to adjust said levers; means provided upon the operating shaft and connected to the recessed shafts and tubular shafts journaled in the movable vertical brackets and adapted to take up the slack of the belt; and manually operative controlling means provided upon the operating shaft and adapted to move the means upon said shaft to adjust the adjusting levers simultaneously with operating the means for taking up the slack of the belt.

37. In a variable speed gear; in combination; a frame having two side bars; a vertically disposed movable bracket provided upon each of the side bars at one end thereof; a stationary bracket provided upon each of the side bars at the opposite end thereof; two expansion pulleys each arranged between the ends of the side bars and each having a rim, said rim consisting of a plurality of interfitting segments, each formed of two parallelogram curved plates having corresponding projecting flanges; bolts connecting the projecting flanges of the curved plates of the interfitting segments; a plurality of pairs of spokes, each spoke having one end formed upon one surface of one of the segments of the rim; a plurality of guiding cams, each provided at the opposite end of one of the spokes and having a recess formed in one edge thereof; a buffer seated in the recess of each of the guiding cams; a belt guided over the rims of the pulleys; a tubular shaft and a recessed shaft journaled in alinement at the opposite ends of the vertical movable brackets of the side bars of said frame; a tubular shaft and a recessed shaft journaled in alinement at the ends of the stationary brackets of the side bars of said frame; two inner shafts, each having one end rotatably held in one of the recessed shafts and the other end rotatable in the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having oppositely disposed curved grooves for reception of the guiding cams of the spokes; a plurality of intermediate plates and middle plates arranged between the S-shaped disks and loosely held upon the projecting bosses thereof, each of said plates having a plurality of guiding grooves provided upon one face thereof and adapted to receive the spokes so as to be guided therein when the guiding cams of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; a spirally grooved jacket rotatably held upon each of the inner shafts between the side bar of the frame and the bearing of said bracket; a sleeve movable upon each of the grooved jackets, and each of said sleeves having two teeth formed upon the interior thereof and adapted to engage the grooves of one of the grooved jackets, each of said sleeves also provided with a groove in the exterior surface thereof; a collar rotatably held in the groove of each of the sleeves and having oppositely-projecting pins; an operating shaft journaled midway of the side bars of the frame and having a threaded portion projecting some distance outwardly from one of said side bars; a bracket provided upon the same side bar and having a head in which is journaled the end of the threaded portion of the shaft, said bracket having a slot formed in the arm thereof; a threaded nut movably held upon the threaded portion of the shaft and having two oppositely-disposed pins; one of which is guided in the slot of the arm of the bracket; two adjusting levers, each having substantially the central part thereof pivotally held upon the pins of said nut; links each having one end pivoted at one of the opposed ends of one of the side bars of the frame and having its other end movably held to one of said adjusting levers; two apertured curved arms provided upon the opposite ends of the levers and movably held upon the pins of the collars; means provided upon the operating shaft and connected to the recessed shafts and tubular shafts journaled in the movable vertical brackets and adapted to take up the slack of the belt; and a grooved toothed wheel keyed upon the threaded portion of the operating shaft adjacent to one of the side bars of the frame and having a cable trained in said groove by which the wheel may be manually rotated to move the means upon said operating shaft to adjust the adjusting levers simultaneously with the means for taking up the slack of the belt.

38. In a variable speed gear; in combination; a frame having two side bars; two expansion pulleys each arranged between the ends of the side bars and each having a rim, said rim consisting of a plurality of interfitting segments, each formed of two parallelogram curved plates having corresponding projecting flanges connected by bolts; a plurality of pairs of spokes, each spoke having one end formed upon one surface of one of the segments of the rim; a plurality of guiding cams, each provided at the opposite end of one of the spokes; a belt guided over the rims of the pulleys; two tubular shafts and two recessed shafts, one of the tubular shafts and one of the recessed shafts being journaled in alinement at the opposite ends of the side bars of said frame; two inner shafts, each having one end rotatably held in one of the recessed shafts and the other end rotatable in the corresponding alined tubular shaft; two drums having end-plates arranged upon the opposed ends of each of said alined tubular shafts and recessed shafts; a plurality of substantially S-shaped disks, each having a boss projecting from one face thereof said disks being keyed at intervals upon each of the inner shafts between the end-plates of the drums and having two oppositely disposed curved grooves for reception of the guiding cams of the spokes; a plurality of intermediate plates and middle plates arranged between the S-shaped disks and loosely held upon the projecting bosses thereof, each of said plates having a plurality of guiding grooves provided upon one face thereof and adapted to receive the spokes so as to be guided therein when the guiding cams of the spokes are engaged by the S-shaped disks; means adapted to connect the peripheral edges of the end-plates and all of said plates within the drums; a bracket provided upon each of the opposite ends of one of the side bars and having a bearing in which is journaled the opposite end of one of the inner shafts; a spirally grooved jacket rotatably held upon each of the inner shafts between the side bar of the frame and the bearing of said bracket; a sleeve movable upon each of the grooved jackets, and each of said sleeves having two teeth formed upon the interior thereof and adapted to engage the grooves of one of the grooved jackets, each of said sleeves also provided with a groove in the exterior surface thereof; a collar rotatably held in the groove of each of the sleeves and having oppositely projecting pins; an anti-friction bearing provided between each wall of the groove of each sleeve and each edge of the collar; an operating shaft journaled midway of the side bars of the frame; and having a threaded portion projecting some distance outwardly from one of said side bars; a nut provided upon the threaded projecting portion of the operating shaft; two adjusting levers, each having substantially the central part thereof pivotally held to the nut upon the projecting portion of the operating shaft; links, each having one end pivoted at one end of one of the side bars of the frame and having its other end movably held to one end of one of the adjusting levers; two apertured curved arms provided upon the opposite ends of the levers and movably held upon the pins of the collars; means connected to the tubular shaft and recessed shaft of one of the pulleys and movable upon the operating shaft for taking up the slack of the belt; and manually operative controlling means provided upon the operating shaft and adapted to move the nut upon said shaft to adjust the adjusting levers simultaneously with said means for taking up the slack of the belt.

39. In a variable speed gear; in combination: a frame having two side bars; a vertically disposed movable bracket provided upon each of the side bars at one end thereof; a stationary bracket provided upon each of the side bars at the opposite end thereof; two expansion pulleys each arranged between the ends of the side bars and each having a rim, said rim consisting of a plurality of interfitting segments, each formed of two parallelogram curved plates having corresponding projecting flanges connected by bolts; a plurality of pairs of spokes, each spoke having one end formed upon one surface of one of the segments of the rim; a plurality of guiding cams, each provided at the opposite end of one of the spokes and having a recess in one edge thereof; a buffer seated in the recess of each spoke; a tubular shaft and a recessed shaft journaled in alinement at the opposite ends of the vertical movable brackets of the side bars of said frame; a tubular shaft and a recessed shaft journaled in alinement at the ends of the stationary brackets of the side bars of said frame; an anti-friction bearing provided in the recess of each of the recessed shafts and in one end of each of the tubular shafts; two inner shafts, each having one end rotatably held in the anti-friction bearing of one of the recessed shafts and the other end rotatable in the anti-friction bearing in the corresponding alined tubular shaft; two drums having end-plates arranged upon the opposed ends of each of said alined tubular shafts and recessed shafts; a plurality of substantially S-shaped disks, each having a boss projecting from one face thereof, said disks being keyed at intervals upon each of the inner shafts between the end-plates of the drums and having two oppositely disposed curved grooves for reception of the guiding cams of the spokes; a plurality of intermediate plates and middle plates arranged between the disks and loosely held upon the projecting bosses thereof, each of said plates having a plurality of guiding grooves provided upon one face thereof and adapted to receive the spokes so as to be guided therein when the guiding cams of the spokes are engaged by the disks; means adapted to connect the peripheral edges of the end-plates and all of said intermediate and middle plates within the drum; a bracket provided upon each of the opposite ends of one of the side bars and having a bearing in which is journaled the opposite end of one of the inner shafts; means provided upon each of the inner shafts and adapted to move said shafts so as to rotate the disks; an operating shaft journaled midway of the side bars of the frame, said operating shaft having a threaded portion projecting some distance outwardly from one of said side bars; a bracket provided upon one of the side bars and having a head in which is journaled the end of the threaded projecting portion of the shaft; two adjusting levers, links, each having one end pivoted at one of the opposed ends of one of the side bars of the frame and having its other end movably held to one of the adjusting levers; two apertured curved arms provided upon the opposite ends of the adjusting levers and adapted to move the means for rotating said inner shafts; means provided upon the threaded projecting portion of the operating shaft and adapted to adjust the adjusting levers; and a grooved toothed wheel keyed upon the threaded projecting portion of the operating shaft and adjacent to one of the side bars of the frame and having a chain trained in said groove by which the wheel may be manually rotated to move the means upon said operating shaft to adjust the adjusting levers for operating the means to simultaneously revolve the inner shafts.

This specification signed and witnessed this eighteenth day of October A. D. 1910.

WILLIAM CHURCH-SMITH.
WILLIAM A. CHURCH-SMITH.

Witnesses:
  ROBT. B. ABBOTT,
  S. SAHNER.

---

Copies of this patent may be obtained for five cents each, by addressing the "Commissioner of Patents, Washington, D. C."